(12) United States Patent
Ogawa et al.

(10) Patent No.: US 11,777,428 B2
(45) Date of Patent: Oct. 3, 2023

(54) POWER CONVERSION SYSTEM AND METHOD FOR CONTROLLING POWER CONVERSION SYSTEM

(71) Applicant: MEIDENSHA CORPORATION, Tokyo (JP)

(72) Inventors: Ryuichi Ogawa, Numazu (JP); Masashi Takiguchi, Fuji (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/024,463

(22) PCT Filed: Jul. 8, 2021

(86) PCT No.: PCT/JP2021/025710
§ 371 (c)(1),
(2) Date: Mar. 2, 2023

(87) PCT Pub. No.: WO2022/049892
PCT Pub. Date: Mar. 10, 2022

(65) Prior Publication Data
US 2023/0246580 A1    Aug. 3, 2023

(30) Foreign Application Priority Data
Sep. 3, 2020   (JP) ................. 2020-148000

(51) Int. Cl.
*H02M 7/539*   (2006.01)
*H02P 21/14*   (2016.01)
(Continued)

(52) U.S. Cl.
CPC ............ *H02P 21/14* (2013.01); *H02M 1/385* (2021.05); *H02M 7/539* (2013.01); *H02P 21/22* (2016.02); *H02P 27/06* (2013.01)

(58) Field of Classification Search
CPC .......... H02P 21/14; H02P 21/22; H02P 27/06; H02M 1/38; H02M 1/385; H02M 7/539
See application file for complete search history.

(56) References Cited

U.S. PATENT DOCUMENTS 8,384,323 B2 *   2/2013   Akiyama ................ H02P 6/188
                                                        318/727
8,922,143 B2 *  12/2014   Takahashi ............... H02P 21/22
                                                     318/400.03

(Continued)

FOREIGN PATENT DOCUMENTS

| JP | 2010-252433 A | 11/2010 |
| JP | 2010-252434 A | 11/2010 |
| JP | 2014-003745 A | 1/2014 |

OTHER PUBLICATIONS

Akihiro Imura et al., "Refined Inverter Model considering the Dead-Time for Model Predictive Instantaneous-current Control of PMSM", IEE-Japan, 2013 Industry Applications Society Conference, 3-65, pp. 323-326, 4 pages.

(Continued)

*Primary Examiner* — Adolf D Berhane
(74) *Attorney, Agent, or Firm* — Foley & Lardner LLP

(57) ABSTRACT

A higher control unit 1 generates a command current i* based on a command value. A model predictive control unit 2 sets a plurality of assumed voltage vectors for each switching cycle of an output voltage, divides the switching cycle of the output voltage into two periods according to a ratio between a dead time and the switching cycle of the output voltage, calculates a predicted current of the assumed voltage vector for each of the two periods obtained by the two-dividing, determines an evaluation function between the assumed voltage vector and the predicted current, sets the assumed voltage vector which has highest evaluation function result, as a command voltage vector. A gate signal g for (Continued)

outputting a voltage expressed by the command voltage vector from the power converter is output. The power converter is driven and controlled based on the gate signal.

9 Claims, 11 Drawing Sheets

(51) Int. Cl.
    *H02M 1/38*     (2007.01)
    *H02P 27/06*     (2006.01)
    *H02P 21/22*     (2016.01)

(56) References Cited

U.S. PATENT DOCUMENTS 11,152,869 B2 * 10/2021 Miklosovic ......... H02M 5/4585
2010/0262307 A1    10/2010 Imura

OTHER PUBLICATIONS

Mitsuhiro Kadota et al., "Application of Model Predictive Control to Current Control System of Permanent Magnet Synchronous Motor", The Institute of Electrical Engineers of Japan, 2011, vol. 131, No. 4, pp. 860-869, 11 pages.

* cited by examiner

IF $i_U > 0$, $v_U = -\frac{v_{dc}}{2}$

IF $i_U < 0$, $v_U = +\frac{v_{dc}}{2}$

POWER CONVERSION SYSTEM AND METHOD FOR CONTROLLING POWER CONVERSION SYSTEM

TECHNICAL FIELD

The present invention relates to a current control method in a system that outputs a voltage using a power converter.

BACKGROUND ART

Consider a system in which an input three-phase AC voltage is converted into a DC voltage by an AC/DC converter and the DC voltage is output as an AC voltage having a desired frequency and a desired amplitude by an inverter (a power converter). The inverter controls an output voltage by switching of semiconductor elements. At this time, a voltage that can be output by the inverter becomes a discrete value.

In such a system, current control may be used in order to bring an output current to a desired value. In a typical configuration of the current control, ACR (Auto Current Regulator: current controller) determines a command voltage as a continuous value. However, in many cases, an output of the inverter is a discrete value, and a continuous voltage value cannot be output in practice. Because of this, a triangular-wave comparison PWM (Pulse Width Modulation) is performed, and a discrete output voltage that can achieve the command voltage on average is determined.

However, there are current control methods other than the configurations using the ACR and the triangular-wave comparison PWM. One example of these is MPC (Model Predictive Control) which is the subject of the present invention. The MPC predicts a change in current for each assumed output voltage, and adopts, as an actual output, such a voltage that a locus of the output current closely follows a command current. The MPC is premised on the discrete output voltage, and a feature of the MPC is that an instantaneous current can be predicted.

Non-Patent Documents 1 and 2 and Patent Document 1 disclose the MPC. Non-Patent Document 1 describes a basic control configuration of the MPC, a current prediction method using an equation of state of a motor and an evaluation method of a predicted current and a voltage vector. Regarding the evaluation method, by considering items such as a deviation between the command current and each predicted current, the maximum value of all deviations and the number of times of change in the voltage vector, an output current that is close to the command current can be obtained, and also an output voltage with a small-number of times of voltage change (a small-number of times of switching) can be determined.

Patent Document 1 discloses a control method of the MPC that performs a prediction operation of the current up to i(n+2). In this Patent Document 1, a time of detection is n, and by predicting a current change during an operation time, i(n+1) is obtained. After that, i(n+2) is calculated from i(n+1) with consideration given to voltage vector branch of an inverter, and a voltage vector is determined by evaluation of i(n+2).

In Non-Patent Document 2, measures against decrease in output voltage value due to a dead time (a buffer period for a rise of a gate signal, provided for short-circuit protection of an inverter) is taken, and a current prediction operation is performed by an inverter model that takes the dead time into consideration.

In the case of the prior art documents, if a switching cycle of the output voltage is shortened, current control performance is decreased. The MPC predicts a current change caused by an assumed voltage vector, and actually outputs a voltage vector that can obtain an optimum current. In many cases, this prediction operation and the switching of the output voltage are performed in a cycle of several tens of µs. However, since the longer the switching cycle of the output voltage is, the rougher the division (or the split) of a pulse width is, in order to obtain stationary current characteristics that are equal to or greater than those of the triangular-wave comparison PWM, a switching cycle of the output voltage of about several µs to 10 µs is desirable.

Here, since, in many cases, the dead time is set to fps to a little less than 10 µs for applications that treat or use a large current, such as large-capacity motor driving, an influence of the dead time is not negligible. Especially when the switching cycle of the output voltage is equal to or less than the dead time, even if it is predicted that a current will change at a certain locus (a certain path) due to the voltage change, the switching cycle exists in the dead time period, then actually the voltage change does not occur depending on a current polarity in the switching cycle. In such a case, the predicted current that is operated (calculated) on the assumption that the voltage changes considerably deviates from an actual output current.

The deviation of the current prediction may pose a risk that a current ripple will increase and/or the number of times of switching will increase. Therefore, in order to increase stationary current performance of the model predictive control, a current prediction operation that takes account of the influence of the dead time is required.

Non-Patent Document 1 and Patent Document 1 do not mention a dynamic current prediction operation that takes account of the dead time.

Non-Patent Document 2 performs the current prediction operation by an output voltage that takes account of the dead time. However, it is formulated in a form that is applicable only when the dead time is equal to or less than a control cycle (the switching cycle of the output voltage). Further, depending on a relationship between the dead time and a value of the control cycle, although the voltage changes not at a timing of an interrupt of the control cycle but at some timing during the control cycle, this Non-Patent Document 2 predicts the current on average of the control cycle one cycle, and predicts only a current of the timing of the interrupt. Because of this, Non-Patent Document 2 cannot consider a peak of the current ripple which appears during the control cycle. If the peak of the current ripple cannot be considered, there is a risk that the current ripple will deviate from a value range to be restricted.

From the above, an object is to suppress the deviation of the current prediction which is caused by the dead time regardless of the setting of the switching cycle of the output voltage in a power conversion system that performs the model predictive control.

CITATION LIST

Patent Document

Patent Document 1: Japanese Unexamined Patent Application Publication No. 2010-252433
Non-Patent Document 1: Mitsuhiro Kadota, Shinji Doki and Shigeru Okuma "Application of Model Predictive Control to Current Control System of Permanent Magnet Synchronous Motor" T.IEE Japan, Vol. 131, No. 4, 2011, pp. 861-869

Non-Patent Document 2: Akihiro Imura, Tomoya Takahashi, Masami Fujitsuna, Tadanao Zanma and Shinji Doki "Refined Inverter Model considering the Dead-Time for Model Predictive Instantaneous-current Control of PMSM" 2013 IEE-Japan Industry Applications Society Conference, 3-65, 2013

SUMMARY OF THE INVENTION

The present invention was devised in view of the above conventional problems. As one aspect of the present invention, a power conversion system comprises: a higher control unit configured to generate a command current based on a command value; a model predictive control unit configured to set a plurality of assumed voltage vectors for each switching cycle of an output voltage, divide the switching cycle of the output voltage into two periods according to a ratio between a dead time and the switching cycle of the output voltage, calculate a predicted current of the assumed voltage vector for each of the two periods obtained by the two-dividing, determine an evaluation function between the assumed voltage vector and the predicted current, set the assumed voltage vector or a combination of the assumed voltage vectors, each of which has highest evaluation function result, as a command voltage vector or a command voltage vector matrix, and output a gate signal based on the command voltage vector or the command voltage vector matrix; and a power converter configured to be driven and controlled based on the gate signal.

As one aspect of the present invention, the switching cycle of the output voltage is divided into two of a first period (Tdead−(S−1)Tc) and a second period (STc−Tdead) based on a set value S that is determined by the following expression (9).

[Expression 9]

$$\frac{T_{dead}}{T_C} \leq S < \frac{T_{dead}}{T_C} + 1 \quad (S \in Z, S \geq 0) \qquad (9)$$

Tdead: a dead time
Tc: a switching cycle of an output voltage
Z: an integer set

As one aspect of the present invention, the model predictive control unit has: a prediction unit configured to set the assumed voltage vector, perform a dead time judgment based on a current polarity and a change of the assumed voltage vector, and when the dead time is judged by the dead time judgment, set a d-axis voltage and a q-axis voltage of the first period in the switching cycle, which is the set value S in number, of the output voltage to a d-axis voltage and a q-axis voltage before the change of the assumed voltage vector respectively, and set the d-axis voltage and the q-axis voltage of the first period after said switching cycle of the output voltage to a d-axis voltage and a q-axis voltage after the change of the assumed voltage vector respectively, also set a d-axis voltage and a q-axis voltage of the second period in the switching cycle, which is the set value (3-1) in number, of the output voltage to a d-axis voltage and a q-axis voltage before the change of the assumed voltage vector respectively, and set the d-axis voltage and the q-axis voltage of the second period after said switching cycle of the output voltage to a d-axis voltage and a q-axis voltage after the change of the assumed voltage vector respectively, determine the predicted current of the assumed voltage vector based on the d-axis voltage and the q-axis voltage of the first period and the d-axis voltage and the q-axis voltage of the second period, determine the evaluation function between the assumed voltage vector and the predicted current, and output, as the command voltage vector, the assumed voltage vector which has the highest evaluation function result; and a gate signal determination unit configured to output the gate signal for outputting a voltage expressed by the command voltage vector from the power converter.

As another aspect of the present invention, the model predictive control unit has: a prediction unit configured to set a plurality of assumed voltage vectors for each switching cycle of the output voltage in a prediction period, perform a dead time judgment based on a current polarity and a change of the assumed voltage vector, and when the dead time is judged by the dead time judgment, set a d-axis voltage and a q-axis voltage of the first period in the switching cycle, which is the set value S in number, of the output voltage to a d-axis voltage and a q-axis voltage before the change of the assumed voltage vector respectively, and set the d-axis voltage and the q-axis voltage of the first period after said switching cycle of the output voltage to a d-axis voltage and a q-axis voltage after the change of the assumed voltage vector respectively, also set a d-axis voltage and a q-axis voltage of the second period in the switching cycle, which is the set value (5-1) in number, of the output voltage to a d-axis voltage and a q-axis voltage before the change of the assumed voltage vector respectively, and set the d-axis voltage and the q-axis voltage of the second period after said switching cycle of the output voltage to a d-axis voltage and a q-axis voltage after the change of the assumed voltage vector respectively, determine the predicted current of the assumed voltage vector based on the d-axis voltage and the q-axis voltage of the first period and the d-axis voltage and the q-axis voltage of the second period, calculate the evaluation function between the assumed voltage vector and the predicted current, and output, as the command voltage vector matrix, the combination of the assumed voltage vectors which has the highest evaluation function result from among combinations of the assumed voltage vectors in the prediction period; a reading unit configured to select and output, as an output voltage vector, a voltage vector of a switching cycle this time of the output voltage from the command voltage vector matrixes of the plurality of switching cycles of the output voltage; and a gate signal determination unit configured to output the gate signal for outputting a voltage expressed by the output voltage vector from the power converter.

As one aspect of the present invention, the predicted current is calculated by the following expressions (18) and (19).

[Expression 18]

$$\begin{pmatrix} i'_d \\ i'_q \end{pmatrix} = \begin{pmatrix} i_d(n+a) \\ i_q(n+a) \end{pmatrix} + T_1 \left\{ A \begin{pmatrix} i_d(n+a) \\ i_q(n+a) \end{pmatrix} + B \begin{pmatrix} v_{d1} \\ v_{q1} \end{pmatrix} + e_\psi \right\} \qquad (18)$$

$$= \begin{pmatrix} i_d(n+a) \\ i_q(n+a) \end{pmatrix} + (T_{dead} - (S-1)T_C) \left\{ A \begin{pmatrix} i_d(n+a) \\ i_q(n+a) \end{pmatrix} + B \begin{pmatrix} v_{d1} \\ v_{q1} \end{pmatrix} + e_\psi \right\}$$

-continued

[Expression 19]

$$\begin{pmatrix} i_d(n+a+1) \\ i_q(n+a+1) \end{pmatrix} = \begin{pmatrix} i'_d \\ i'_q \end{pmatrix} + T_2 \left\{ A \begin{pmatrix} i'_d \\ i'_q \end{pmatrix} + B \begin{pmatrix} v_{d2} \\ v_{q2} \end{pmatrix} + e_\psi \right\} \quad (19)$$

$$\begin{pmatrix} i'_d \\ i'_q \end{pmatrix} + (ST_C - T_{dead}) \left\{ A \begin{pmatrix} i'_d \\ i'_q \end{pmatrix} + B \begin{pmatrix} v_{d2} \\ v_{q2} \end{pmatrix} + e_\psi \right\}$$

here, $A = \begin{pmatrix} -\dfrac{R}{L_d} & \omega_r \dfrac{L_q}{L_d} \\ -\omega_r \dfrac{L_d}{L_q} & -\dfrac{R}{L_d} \end{pmatrix}$, $b = \begin{pmatrix} \dfrac{1}{L_d} & 0 \\ 0 & \dfrac{1}{L_q} \end{pmatrix}$, $e_\psi = \begin{pmatrix} 0 \\ -\dfrac{1}{L_q} \omega_r \psi \end{pmatrix}$, $$\dfrac{T_{dead}}{T_C} \leq S < \dfrac{T_{dead}}{T_C} + 1 \quad (S \in Z, S \geq 0)$$

id': a d-axis current a first period ahead from a certain time
iq': a q-axis current a first period ahead from a certain time
id(n+a): a d-axis current of a certain time
iq(n+a): a q-axis current of a certain time
id(n+a+1): a predicted d-axis current a switching cycle of an output voltage ahead from a certain time
iq(n+a+1): a predicted q-axis current a switching cycle of an output voltage ahead from a certain time
T1: a first period
T2: a second period
Tdead: a dead time
Tc: a switching cycle of an output voltage
Vd1: a d-axis voltage of a first period
Vd2: a d-axis voltage of a second period
vq1: a q-axis voltage of a first period
Vq2: a q-axis voltage of a second period
S: a set value
R: a winding resistance
Ld: a d-axis inductance
Lq: a q-axis inductance
Qr: an electrical angular velocity
ψ: the number of permanent magnet flux linkages As another aspect of the present invention, the predicted current is calculated by the following expression (48).

[Expression 48]

$$\begin{pmatrix} i_d(n+a+1) \\ i_q(n+a+1) \end{pmatrix} = \begin{pmatrix} i'_d \\ i'_q \end{pmatrix} + (ST_C - T_{dead}) \left\{ A \begin{pmatrix} i_d(n+a) \\ i_q(n+a) \end{pmatrix} + B \begin{pmatrix} v_{d2} \\ v_{q2} \end{pmatrix} + e_\psi \right\} = \quad (48)$$

$$\begin{pmatrix} i_d(n+a) \\ i_q(n+a) \end{pmatrix} + (T_{dead} - (S-1)T_C) \left\{ A \begin{pmatrix} i_d(n+a) \\ i_q(n+a) \end{pmatrix} + B \begin{pmatrix} v_{d1} \\ v_{q1} \end{pmatrix} + e_\psi \right\} +$$

$$(ST_C - T_{dead}) \left\{ A \begin{pmatrix} i_d(n+a) \\ i_q(n+a) \end{pmatrix} + B \begin{pmatrix} v_{d2} \\ v_{q2} \end{pmatrix} + e_\psi \right\} =$$

$$\begin{pmatrix} i_d(n+a) \\ i_q(n+a) \end{pmatrix} + T_C A \begin{pmatrix} i_d(n+a) \\ i_q(n+a) \end{pmatrix} + T_C e_\psi +$$

$$(T_{dead} - (S-1)T_C) B \begin{pmatrix} v_{d1} \\ v_{q1} \end{pmatrix} + (ST_C - T_{dead}) B \begin{pmatrix} v_{d2} \\ v_{q2} \end{pmatrix}$$

here, $A = \begin{pmatrix} -\dfrac{R}{L_D} & \omega_r \dfrac{L_q}{L_d} \\ -\omega_r \dfrac{L_d}{L_q} & -\dfrac{R}{L_q} \end{pmatrix}$, $B = \begin{pmatrix} \dfrac{1}{L_d} & 0 \\ 0 & \dfrac{1}{L_q} \end{pmatrix}$, $e_\psi = \begin{pmatrix} 0 \\ -\dfrac{1}{L_q} \omega_r \psi \end{pmatrix}$, $$\dfrac{T_{dead}}{T_C} \leq S < \dfrac{T_{dead}}{T_C} + 1 \quad (S \in Z, S \geq 0)$$

id': a d-axis current a first period ahead from a certain time
iq': a q-axis current a first period ahead from a certain time
id(n+a): a d-axis current of a certain time
iq(n+a): a q-axis current of a certain time
id(n+a+1): a predicted d-axis current a switching cycle of an output voltage ahead from a certain time
iq(n+a+1): a predicted q-axis current a switching cycle of an output voltage ahead from a certain time
T1: a first period
T2: a second period
Tdead: a dead time
Tc: a switching cycle of an output voltage
Vd1: a d-axis voltage of a first period
Vd2: a d-axis voltage of a second period
vq1: a q-axis voltage of a first period
Vq2: a q-axis voltage of a second period
S: a set value
R: a winding resistance
Ld: a d-axis inductance
Lq: a q-axis inductance
Ωr: an electrical angular velocity
ψ: the number of permanent magnet flux linkages According to the present invention, it is possible to suppress the deviation of the current prediction which is caused by the dead time regardless of the setting of the switching cycle of the output voltage in the power conversion system that performs the model predictive control.

EMBODIMENTS FOR CARRYING OUT THE INVENTION

Embodiments 1 to 4 of a power conversion system using model predictive control (MPC) according to the present invention will be described in detail with reference to FIGS. 1 to 12.

Embodiment 1

Figure 1:
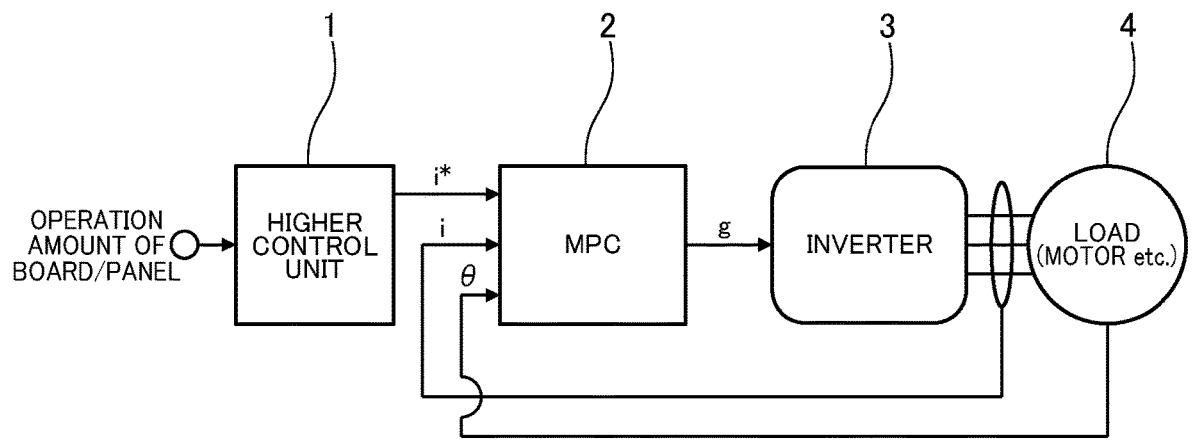
FIG. 1 is a block diagram showing a power conversion system in embodiments 1 to 4.

FIG. 1 illustrates a block diagram of a power conversion system in the present embodiment. Although the present invention contemplates the power conversion system that drives a motor by an inverter in the present embodiment 1, a system and a circuit configuration of the present invention are not limited as long as the MPC is configured to perform current control.

A higher control unit 1 indicates a control existing upstream of an MPC 2. For instance, it performs a speed control operation using a speed command and a detection speed based on an operation amount of a board/panel and information such as an accelerator opening, and generates a command current i*.

The command current i* output from the higher control unit 1, a detection current i and a detection phase θ are input to the MPC (a model predictive control unit) 2. Here, θ is an electrical angle, and for instance, if a detection value is a mechanical position of a motor, conversion is performed using the number of pole pairs as appropriate.

The MPC 2 performs an operation for predicting next and subsequent current(s) based on model parameters, and on the basis of this result, determines a voltage vector. The MPC 2 outputs a gate signal g to be output according to the determined voltage vector, and a power converter (e.g. an inverter, hereinafter referred to as the inverter) 3 is driven by the gate signal g.

The inverter 3 is connected to a load 4 such as the motor, and a voltage according to the gate signal g is applied to the load 4.

FIG. 1 is a representative example of the system configuration of the power conversion system by the MPC, but application target of the present invention is not limited to this. It could be, for instance, a configuration in which current control is performed based on model prediction in a DC/AC converter that regenerates a power supply, a configuration in which an electrical angle is estimated by PLL (Phase Locked Loop) and used in the MPC, a configuration of a single phase and so on. The important thing is that the voltage vector is determined based on the current prediction result by the model predictive control, and the power converter is driven by the voltage vector.

Definitions of cycle, period, etc. related to the control in the present description are indicated below. Prediction division (prediction split or prediction degree): time of division of current prediction (time width treated or used by one current prediction operation) Prediction period: time width between the forward-most time at which the current is predicted and a current time (total time width treated or used by all operations of the current prediction) Output cycle: switching cycle of an output voltage Operation cycle: cycle in which the prediction operation is performed In the present embodiment 1, the operation cycle and the output cycle are the same.

The MPC 2 assumes a plurality of voltage vectors of the inverter 3 in each output cycle, determines predicted currents of a case where the plurality of assumed voltage vectors are output, adopts a voltage vector by which an optimum prediction result can be obtained, and performs an actual output.

Here, since the MPC 2 evaluates the predicted currents and determines the output voltage, accuracy of the current prediction becomes important.

The MPC 2 of the present embodiment 1 performs the current prediction operation with each period obtained by dividing the output cycle into two being the prediction division. By the current prediction operation based on this prediction division, it is possible to perform the current prediction operation that takes account of the dead time regardless of a magnitude relationship between the dead time and the output cycle.

In addition, since the output cycle is divided according to a change timing of an actual output voltage, it is possible to judge the optimality of the voltage vector with consideration given to an instantaneous change point of the current, i.e. a peak of a current ripple. Here, it is noted that since the output cycle is divided according to a ratio between the dead time and a length of the output cycle, the output cycle is not necessarily divided in half.

The following will describe a method of the current prediction operation in and by the MPC 2, then will show that the current prediction operation that takes account of the dead time becomes possible by dividing the output cycle into two. After that, a configuration of the MPC 2 having the current prediction operation with the output cycle divided into two will be described.

The current prediction operation is based on an equation of state. For instance, when a PMSM (a permanent magnet synchronous motor) is used as the load 4, the equation of state is the following equation of state of an expression (1). Here, id is a d-axis current, iq is a q-axis current, vd is a d-axis voltage, vq is a q-axis voltage, ωr is an electrical angular velocity, Ld is a d-axis inductance, Lq is a q-axis inductance, R is a winding resistance, and ψ is the number of permanent magnet flux linkages. The expression (1), i.e. PMSM, will be described as a reference, but from the essence of the present invention, the present invention can be applied to cases other than the case where the equation of state is the expression (1).

[Expression 1]

$$\begin{pmatrix} \frac{di_d}{dt} \\ \frac{di_q}{dt} \end{pmatrix} = A \begin{pmatrix} i_d \\ i_q \end{pmatrix} + B \begin{pmatrix} d_d \\ v_q \end{pmatrix} + e_\psi \quad (1)$$

$$\text{here, } A = \begin{pmatrix} -\frac{R}{L_d} & \omega_r \frac{L_q}{L_d} \\ -\omega_r \frac{L_d}{L_q} & -\frac{R}{L_d} \end{pmatrix}, B = \begin{pmatrix} \frac{1}{L_d} & 0 \\ 0 & \frac{1}{L_q} \end{pmatrix}, e_\psi = \begin{pmatrix} 0 \\ -\frac{1}{L_q} \omega_r \psi \end{pmatrix}$$

The expression (1) is a continuous equation of state. However, in order to treat this expression in a discrete control system, when converting this expression to a discrete equation of state, it is the following expression (2). Further, by treating the expression as a simple approximate variation by taking the product of a slope (an inclination) and an output cycle Tc, the expression may be expressed as the following expression (3).

[Expression 2]

$$\begin{pmatrix} i_d(n+1) \\ i_q(n+1) \end{pmatrix} = e^{AT_c} \begin{pmatrix} i_d(n) \\ i_q(n) \end{pmatrix} + A^{-1}(e^{AT_c} - I)\left(B \begin{pmatrix} v_d(n) \\ v_q(n) \end{pmatrix} + e_\psi\right) \quad (2)$$

[Expression 3]

$$\begin{pmatrix} i_d(n+1) \\ i_q(n+1) \end{pmatrix} = \begin{pmatrix} i_d(n) \\ i_q(n) \end{pmatrix} + T_c \begin{pmatrix} \frac{di_d}{dt} \\ \frac{di_q}{dt} \end{pmatrix} \quad (3)$$

$$= \begin{pmatrix} i_d(n) \\ i_q(n) \end{pmatrix} + T_c \left(A \begin{pmatrix} i_d(n) \\ i_q(n) \end{pmatrix} + B \begin{pmatrix} v_d(n) \\ v_q(n) \end{pmatrix} + e_\psi\right)$$

When seeing the expression (2) and the expression (3), it can be understood that in order to predict currents id(n+1) and iq(n+1) output cycle one cycle ahead, currents id(n) and iq(n) and voltages vd(n) and vq(n) which correspond to the current time are necessary.

Figure 2:
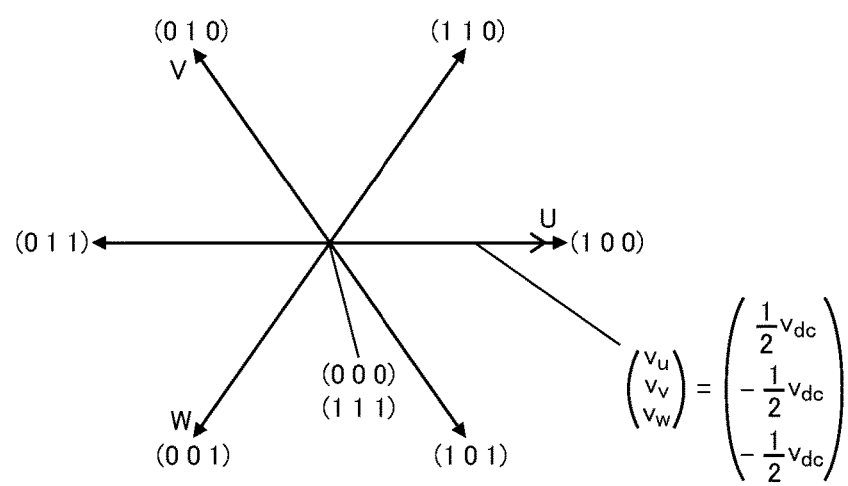
FIG. 2 is an explanatory drawing showing a relationship between voltage vectors of a two-level inverter and phase voltages.

As the voltages vd(n) and vq(n), voltage vectors assumed in a preceding stage of the prediction operation are used. For instance, in a case of a two-level inverter of a DC voltage vdc, voltage vectors are shown in FIG. 2. Therefore, by calculation of the following expression (4), the assumed voltage vectors can be converted to voltages on a dq-axis. Here, θ(n) is an electrical phase of the motor. Although the phase may undergo leading-compensation according to angular frequency, its detailed operation will be described later.

[Expression 4]

$$\begin{pmatrix} v_d \\ v_q \end{pmatrix} = \begin{pmatrix} \cos(\theta(n)) & \sin(\theta(n)) \\ -\sin(\theta(n)) & \cos(\theta(n)) \end{pmatrix} \cdot \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} v_u \\ v_v \\ v_w \end{pmatrix} \quad (4)$$

The currents id(n) and iq(n) are referenced to detection values. When performing a plurality of current prediction operations, for operation (calculation) for determining currents id(n+a+1) and iq(n+a+1) from currents id(n+a) and iq(n+a) which are currents in the middle of the prediction, the predicted values id(n+a) and iq(n+a) determined by an (n+a)th operation could be used. The above is the current prediction operation in and by the MPC 2.

Next, the current prediction operation that takes account of the dead time by dividing the output cycle into two will be described. In this current prediction operation, the dead time is considered using a dead time counter. Firstly, a basic operation will be described, and secondly, setting of the dead time counter will be described, then lastly, an operation example for each constant setting will be illustrated.

Figure 3:
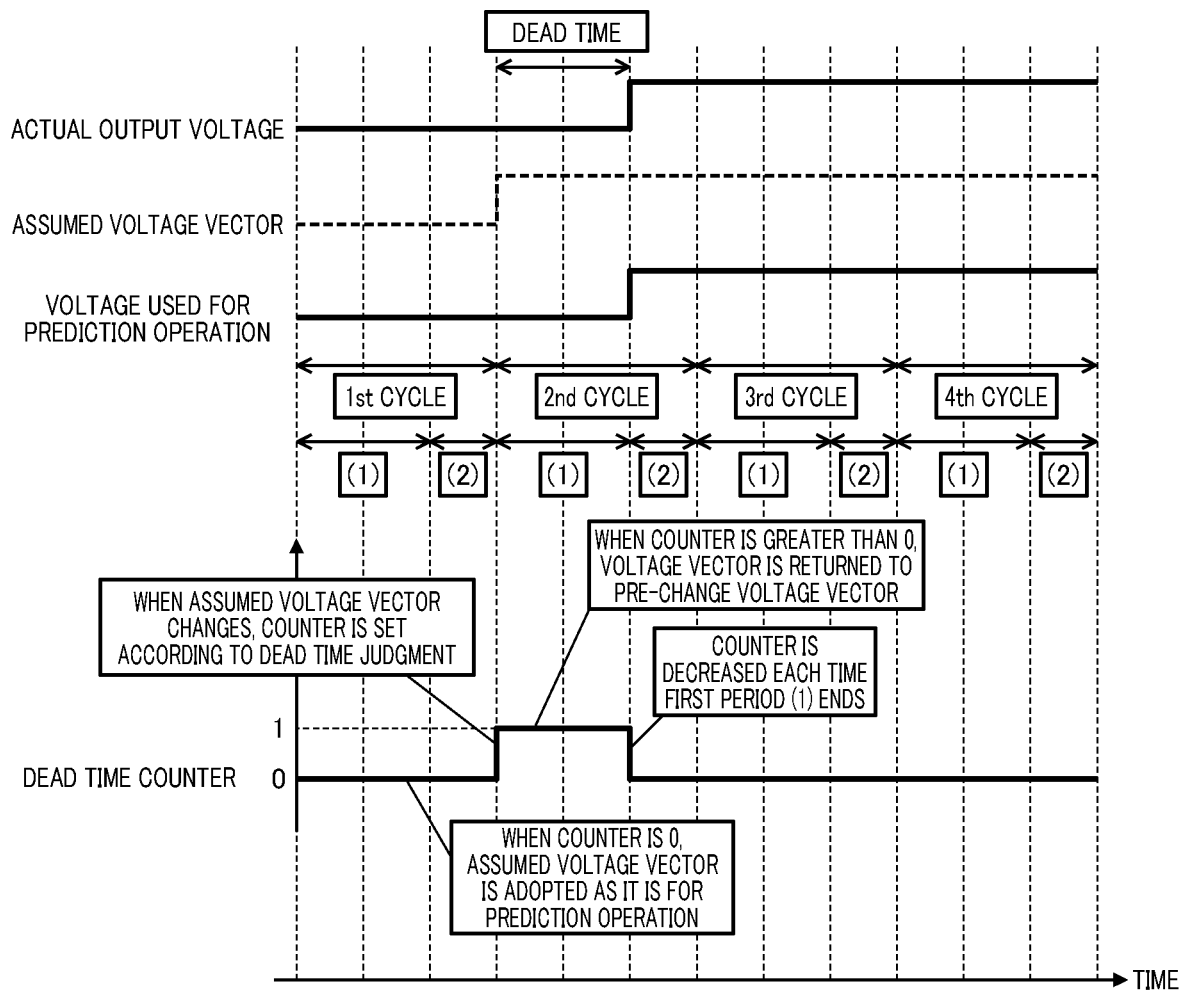
FIG. 3 is a time chart showing a prediction operation that takes account of a dead time.

FIG. 3 shows a prediction operation using the dead time counter. Words such as 1st cycle and 2nd cycle in FIG. 3 indicate a time series of the output cycle. Words such as (1) and (2) are divided periods of the output cycle which are determined by the ratio between the dead time and the output cycle. In FIG. 3, (1) and a length of the dead time are equal to each other.

The assumed voltage vector is a voltage vector that is set as a candidate for switching of the voltage vector by the MPC 2, and is assumed or hypothesized as a voltage vector that changes by or at an interrupt of the output cycle. The dead time counter is set at a time of the change of the assumed voltage vector. Then, a pre-change voltage (or a before-change voltage, i.e. a voltage before the change) is used for the prediction operation until the dead time counter becomes 0. With this, the dead time is taken into consideration.

When seeing FIG. 3, at a time of the change of the assumed voltage vector, the dead time counter is set to 1. Then, the pre-change voltage is used for the current prediction operation while the dead time counter is 1, and the voltage change can be assumed at the same timing as the actual output voltage. By performing the prediction operation in this manner, the current prediction that takes account of the dead time becomes possible. The above is the basic operation of the current prediction operation that takes account of the dead time.

In the following description, the setting of the dead time counter in the current prediction operation that takes account of the dead time will be described.

First, since an inverter output voltage during a dead time period differs depending on a condition, a dead time judgment that takes account of the output voltage during the dead time period will be described. For the dead time judgment, in the present description, estimation of the output voltage is performed in current form. In the following, for the sake of convenience, U-phase is taken as an example for the description, but in practice, the dead time is considered for each phase of UVW phases.

Figure 4A:
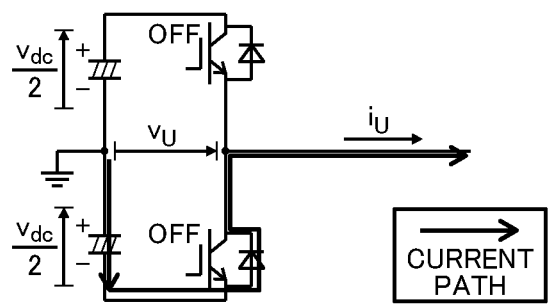
FIGS. 4A and 4B are drawings showing a relationship between a current polarity and an output voltage during the dead time.
Figure 4B:
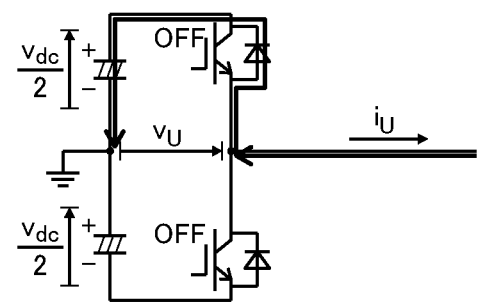

FIGS. 4A and 4B illustrate a relationship between a current polarity and the output voltage during the dead time. vdc is a DC voltage, vU is a U-phase output voltage, and iU is a U-phase current. Although the two-level inverter is assumed in the present embodiment 1, when used for a different configuration, an output voltage for each condition is determined according to a circuit configuration as appropriate. When considering a change in a phase voltage of a single phase in the two-level inverter, a half-bridge configuration could be considered.

In a case of iU>0 as shown in FIG. 4A, since a current passes through a diode of a lower arm, the U-phase output voltage vU is −vdc/2. Conversely, in a case of iU<0 as shown in FIG. 4B, since the current passes through a diode of an upper arm, the U-phase output voltage vU is +vdc/2.

In light of FIGS. 4A and 4B, consider the dead time judgment. Since the dead time counter needs to be set when the change of the actual voltage is delayed by the dead time, the following cases are set.

In the case of iU>0, if the change is "vU=−vdc/2"→"vU=+vdc/2", the dead time counter is set.

In the case of iU<0, if the change is "vU=+vdc/2"→"vU=−vdc/2", the dead time counter is set.

Next, a division point of the output cycle will be discussed. As described above, the division point is determined by the ratio between the output cycle and the dead time.

Figure 5A:
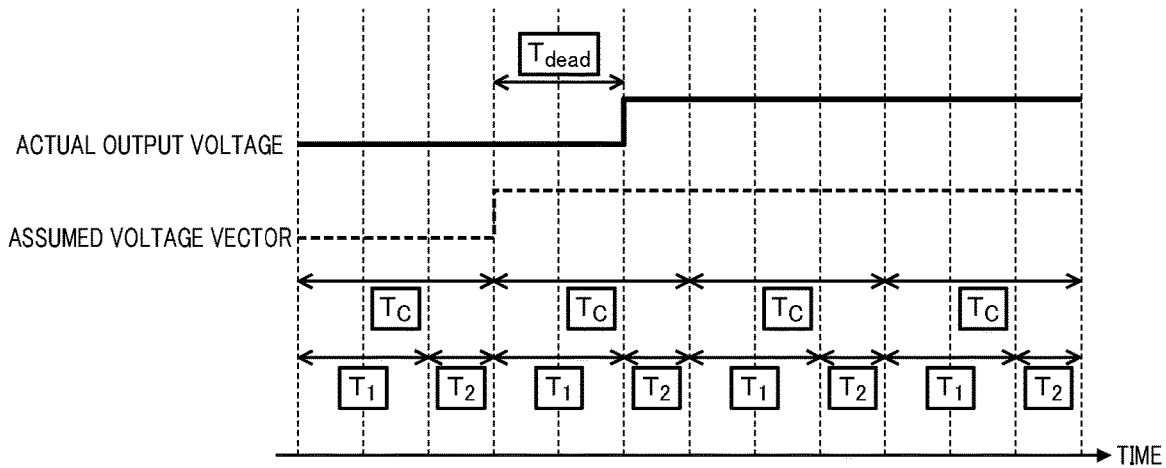
FIGS. 5A, 5B and 5C are drawings showing a relationship between an output cycle and the dead time.
Figure 5B:
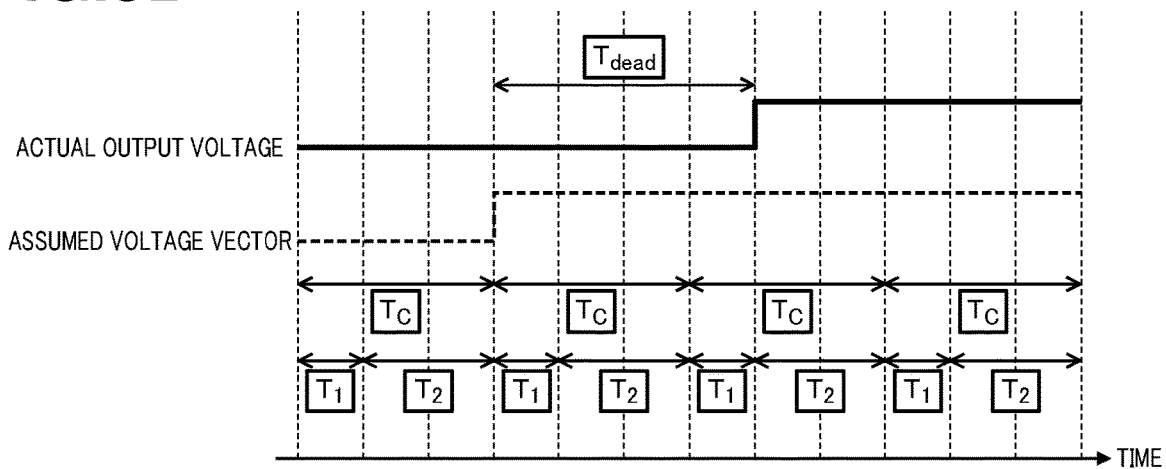
Figure 5C:
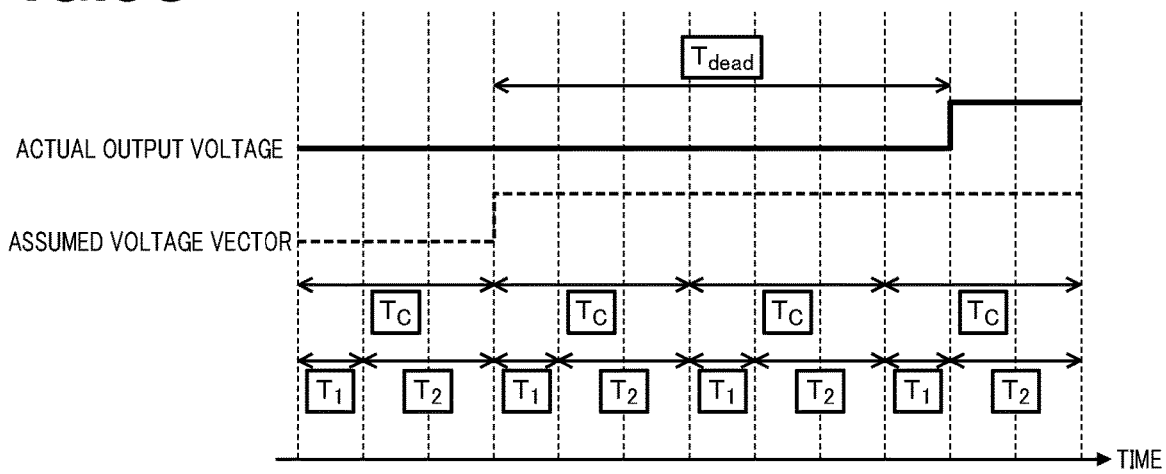

FIGS. 5A, 5B and 5C illustrate a magnitude relationship between the output cycle and the dead time. A magnitude relationship between the output cycle Tc and a dead time Tdead differs between FIGS. 5A, 5B and 5C.

From ease of illustration, a dead time Tdead that is divisible by ⅓ times the output cycle Tc is selected. Regarding divided periods T1 and T2 shown in FIGS. 5A, 5B and 5C, the divided periods T1 and T2 in FIG. 5A are determined by an expression (5), the divided periods T1 and T2 in FIG. 5B are determined by an expression (6), and the divided periods T1 and T2 in FIG. 5C are determined by an expression (7). It is noted that if the dead time Tdead is an integral multiple of the output cycle Tc, the output cycle may be divided in any manner, or may not be divided.

[Expression 5]

$$\begin{cases} T_1 = T_{dead} \\ T_2 = T_C - T_{dead} \end{cases} \quad (5)$$

[Expression 6]

$$\begin{cases} T_1 = T_{dead} - T_C \\ T_2 = 2T_C - T_{dead} \end{cases} \quad (6)$$

[Expression 7]

$$\begin{cases} T_1 = T_{dead} - 2T_C \\ T_2 = 3T_C - T_{dead} \end{cases} \quad (7)$$

By combining the expressions (5) to (7), it is estimated that setting of the division point takes a form of an expression (8).

[Expression 8]

$$\begin{cases} T_1 = T_{dead} - (n-1)T_C \\ T_2 = nT_C - T_{dead} \end{cases} \quad (n \in Z, n \geq 0) \tag{8}$$

A plausible setting of n is performed using a set value of the dead time counter which is described below.

The dead time counter is used under the following conditions. A first half of the divided periods which is represented as T1 is referred to as a first period (1), and a second half of the divided periods which is represented as T2 is referred to as a second period (2).

- A value is set according to the dead time judgment.
- The counter value is decreased each time the first period (1) ends. (The minimum value is 0.)
- The voltage vector used for the prediction operation is set by referring to the counter of the corresponding period.

Under these conditions, by setting the set value S of the dead time counter as expressed by an expression (9), the prediction operation that takes account of the dead time can be performed. Here, Z in the expression (9) is an integer set.

[Expression 9]

$$\frac{T_{dead}}{T_C} \leq S < \frac{T_{dead}}{T_C} + 1 \quad (S \in Z, S \geq 0) \tag{9}$$

Since the set value S is a number that represents the magnitude relationship between the output cycle Tc and the dead time Tdead, n in the expression (8) can be replaced with S in the expression (9). When seeing an expression (10) where n is S (n=S) in the expressions (8) and (9), it can be understood that the settings of the dead time Tdead and the output cycle Tc in FIGS. 5A, 5B and 5C satisfy the expressions (5) to (7).

[Expression 10]

$$\begin{cases} T_1 = T_{dead} - (S-1)T_C \\ T_2 = ST_C - T_{dead} \end{cases} \quad (S \in Z, S \geq 0) \tag{10}$$

The above is the setting of the dead time counter.

In the following, the operation for each constant setting in the current prediction operation that takes account of the dead time will be verified. As the constant setting, using three types of settings such as a case where the dead time Tdead is less than the output cycle Tc, a case where the dead time Tdead is equal to or greater than one time the output cycle Tc and less than double the output cycle Tc and a case where the dead time Tdead is equal to or greater than double the output cycle Tc and less than triple the output cycle Tc, it is shown that the present embodiment 1 can be applied regardless of the setting of the dead time Tdead and the output cycle Tc.

Figure 6A:
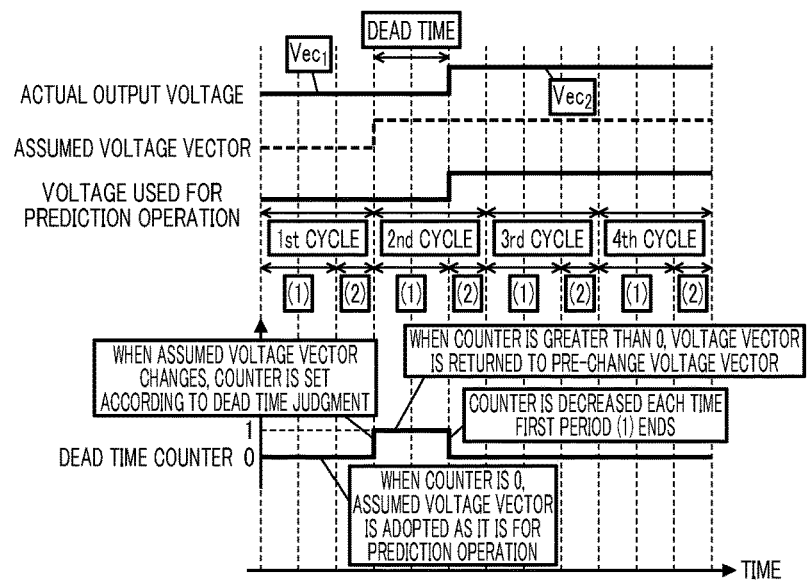
FIGS. 6A, 6B and 6C are drawings showing a magnitude relationship between the dead time and the output cycle and operation of a dead time counter.
Figure 6B:
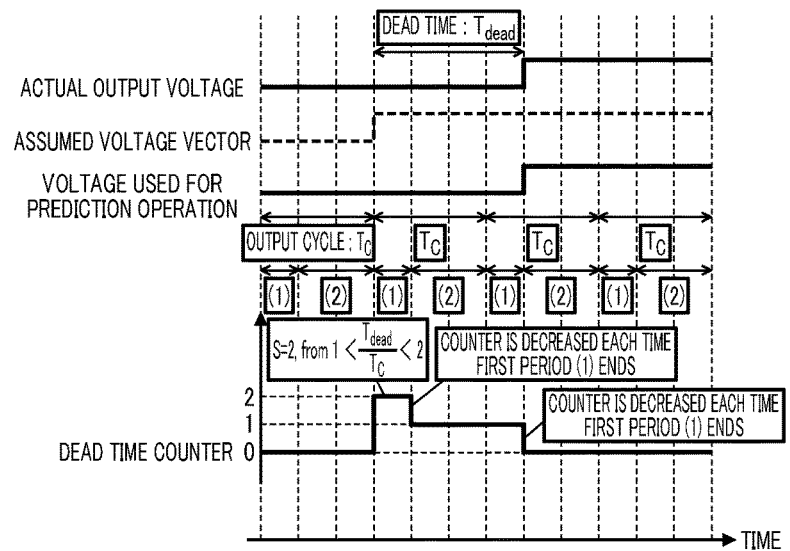
Figure 6C:
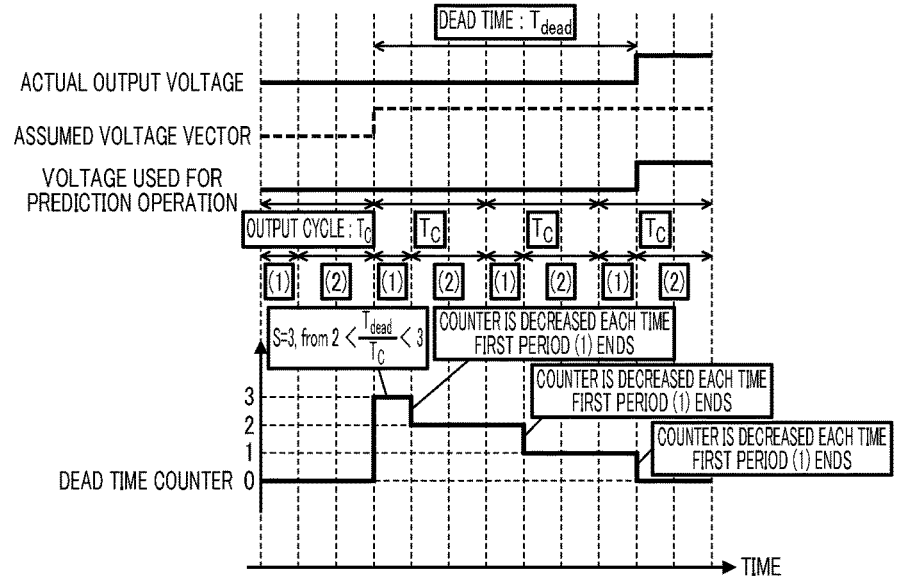

FIGS. 6A, 6B and 6C illustrate the magnitude relationship between the dead time Tdead and the output cycle Tc and the operation of the dead time counter. The types of the magnitude relationship shown in FIGS. 6A, 6B and 6C correspond to FIGS. 5A, 5B and 5C.

When seeing the change timing of the voltage, it can be understood that by the setting of the dead time counter based on the expression (9) and the counter decrease each time the first period (1) ends, the dead time can be considered for the voltage used for the prediction operation.

In the current prediction operation, there are cases where the output voltage changes based on the dead time Tdead during the output cycle Tc and where the output voltage does not change but is constant during the output cycle Tc. The current prediction operation with the two-division of the present embodiment 1 operates without problems in either case. This is shown using mathematical expressions. When terms other than a term related to the voltage in the equation of state expressed by the expression (1) are regarded as approximately constant and current variations (amounts of current change) Δid and Δiq in a period t are obtained by forward Euler method of the expression (3), an expression (11) is obtained.

[Expression 11]

$$\begin{pmatrix} \Delta i_d \\ \Delta i_q \end{pmatrix} = t \cdot \begin{pmatrix} \frac{di_d}{dt} \\ \frac{di_q}{dt} \end{pmatrix} = t \cdot \left\{ K + B \begin{pmatrix} v_d \\ v_q \end{pmatrix} \right\} \tag{11}$$

$$\text{here, } K = A \begin{pmatrix} i_d \\ i_q \end{pmatrix} + e_\psi, \quad A = \begin{pmatrix} -\frac{R}{L_d} & \omega_r \frac{L_q}{L_d} \\ -\omega_r \frac{L_d}{L_q} & -\frac{R}{L_d} \end{pmatrix},$$

$$B = \begin{pmatrix} \frac{1}{L_d} & 0 \\ 0 & \frac{1}{L_q} \end{pmatrix}, \quad e_\psi = \begin{pmatrix} 0 \\ -\frac{1}{L_q} \omega_r \psi \end{pmatrix}$$

The current prediction operation during the output cycle Tc is performed based on the expression (11). As shown in FIGS. 6A, 6B and 6C, a (an assumed) voltage vector before the change is Vec1, and a (an assumed) voltage vector after the change is Vec2. Further, dq-axis voltages after UVW/dq conversion of the Vec1 are vd1 and vq1, and dq-axis voltages after UVW/dq conversion of the Vec2 are vd2 and vq2.

In a case of the 1st cycle in FIG. 6A, the current variation (the amount of the current change) in the entire output cycle Tc can be calculated as shown in an expression (12). Strictly speaking, K of the second period (2) should be recalculated using a current value at a time of the end of the first period (1). However, for the sake of clarity, this is omitted once here. In the case of the condition of FIG. 6A, S is 1 (S=1), and as a result of cancelling out the dead time, the expression (12) is a form that is obtained by simply substituting Tc, vd1 and vq1 for t, vd and vq respectively (i.e. t=Tc, vd=vd1 and vq=vq1) in the expression (11), and this is equivalent to the current prediction operation with no division.

[Expression 12]

$$\begin{pmatrix} \Delta i_d \\ \Delta i_q \end{pmatrix} = T_1 \cdot \left\{ K + B \begin{pmatrix} v_{d1} \\ v_{q1} \end{pmatrix} \right\} + T_2 \cdot \left\{ K + B \begin{pmatrix} v_{d1} \\ v_{q2} \end{pmatrix} \right\} \tag{12}$$

$$= (T_{dead} - (S-1)T_C) \cdot \left\{ K + B \begin{pmatrix} v_{d1} \\ v_{q1} \end{pmatrix} \right\} +$$

$$(S \cdot T_C - T_{dead}) \cdot \left\{ K + B \begin{pmatrix} v_{d1} \\ v_{q1} \end{pmatrix} \right\}$$

$$= (T_{dead} - (1-1)T_C) \cdot \left\{ K + B \begin{pmatrix} v_{d1} \\ v_{q2} \end{pmatrix} \right\} +$$

$$(1 \cdot T_C - T_{dead}) \cdot \left\{ K + B \begin{pmatrix} v_{d1} \\ v_{q1} \end{pmatrix} \right\}$$

$$= T_C \cdot \left\{ K + B \begin{pmatrix} v_{d1} \\ v_{q1} \end{pmatrix} \right\}$$

In a case of the 2nd cycle in FIG. 6A, the current variation is an expression (13). It is noted that the Vec1 is used for the first period (1) and the Vec2 is used for the second period (2). When seeing the final form of the expression (13), the dq-axis voltage of the Vec1 is used for the current variation for the period of the dead time Tdead, and the dq-axis voltage of the Vec2 is used for the current variation for a period (Tc−Tdead) from the end of the dead time to the end of the output period. Therefore, the prediction operation according to the voltage change timing can be performed.

The expression (13) is the same as an expression that takes account of the dead time shown in Non-Patent Document 2. That is, a method of this Non-Patent Document 2 is equivalent to a case where S is 1 (S=1) and the same K is used for the first period (1) and the second period (2) with recalculation of K being omitted (neglected) in the present embodiment 1. In addition, because of this, this Non-Patent Document 2 cannot deal with cases other than S=1, and it can be said that decrease in prediction accuracy of an instantaneous current due to the neglect of the recalculation of K occurs.

[Expression 13]

$$\begin{pmatrix} \Delta i_d \\ \Delta i_q \end{pmatrix} = T_1 \cdot \left\{ K + B \begin{pmatrix} v_{d1} \\ v_{q1} \end{pmatrix} \right\} + T_2 \cdot \left\{ K + B \begin{pmatrix} v_{d2} \\ v_{q2} \end{pmatrix} \right\} \quad (13)$$

$$= (T_{dead} - (S-1)T_C) \cdot \left\{ K + B \begin{pmatrix} v_{d1} \\ v_{q1} \end{pmatrix} \right\} +$$

$$(S \cdot T_C - T_{dead}) \cdot \left\{ K + B \begin{pmatrix} v_{d2} \\ v_{q2} \end{pmatrix} \right\}$$

$$= (T_{dead} - (1-1)T_C) \cdot \left\{ K + B \begin{pmatrix} v_{d1} \\ v_{q1} \end{pmatrix} \right\} +$$

$$(1 \cdot T_C - T_{dead}) \cdot \left\{ K + B \begin{pmatrix} v_{d1} \\ v_{q1} \end{pmatrix} \right\}$$

$$= T_{dead} \cdot \left\{ K + B \begin{pmatrix} v_{d1} \\ v_{q1} \end{pmatrix} \right\} + (T_C - T_{dead}) \cdot \left\{ K + B \begin{pmatrix} v_{d2} \\ v_{q2} \end{pmatrix} \right\}$$

As for the 3rd and 4th cycles in FIG. 6A, only the dq-axis voltages are changed to vd2 and vq2 in the expression (12).

FIG. 6B is also considered in the same way. In a case of the 1st cycle in FIG. 6B, the current variation is an expression (14). It is noted that in the case of the condition of FIG. 6B, S is 2 (S=2). If the voltage vector is the same in the first and second periods (1) and (2), the expression is the same form as the expression (12) regardless of the value of S.

[Expression 14]

$$\begin{pmatrix} \Delta i_d \\ \Delta i_q \end{pmatrix} = T_1 \cdot \left\{ K + B \begin{pmatrix} v_{d1} \\ v_{q1} \end{pmatrix} \right\} + T_2 \cdot \left\{ K + B \begin{pmatrix} v_{d1} \\ v_{q1} \end{pmatrix} \right\} \quad (14)$$

$$= (T_{dead} - (2-1)T_C) \cdot \left\{ K + B \begin{pmatrix} v_{d1} \\ v_{q1} \end{pmatrix} \right\} +$$

$$(S \cdot T_C - T_{dead}) \cdot \left\{ K + B \begin{pmatrix} v_{d1} \\ v_{q1} \end{pmatrix} \right\}$$

$$= T_C \cdot \left\{ K + B \begin{pmatrix} v_{d1} \\ v_{q1} \end{pmatrix} \right\}$$

Regarding the 2nd cycle in FIG. 6B, since the voltage vector is held at the pre-change Vec1 (the Vec1 before the change) as it is by the dead time counter, the expression is the same as the expression (14).

In a case of the 3rd cycle in FIG. 6B, the current variation is an expression (15). Since the dead time Tdead in FIG. 6B is longer than one cycle of the output cycle Tc and shorter than two cycles, (Tdead−Tc) represents a period of a remainder that occurs by the fact that the dead time Tdead is not divisible by the output cycle Tc, and (2Tc−Tdead) represents (the output cycle−the remainder). Even if S is 2 (S=2), the prediction operation according to the voltage change timing can be performed.

[Expression 15]

$$\begin{pmatrix} \Delta i_d \\ \Delta i_q \end{pmatrix} = T_1 \cdot \left\{ K + B \begin{pmatrix} v_{d1} \\ v_{q1} \end{pmatrix} \right\} + T_2 \cdot \left\{ K + B \begin{pmatrix} v_{d2} \\ v_{q2} \end{pmatrix} \right\} \quad (15)$$

$$= (T_{dead} - (2-1)T_C) \cdot \left\{ K + B \begin{pmatrix} v_{d1} \\ v_{q1} \end{pmatrix} \right\} +$$

$$(2 \cdot T_C - T_{dead}) \cdot \left\{ K + B \begin{pmatrix} v_{d2} \\ v_{q2} \end{pmatrix} \right\}$$

$$= (T_{dead} - T_C) \cdot \left\{ K + B \begin{pmatrix} v_{d1} \\ v_{q1} \end{pmatrix} \right\} +$$

$$(2T_C - T_{dead}) \cdot \left\{ K + B \begin{pmatrix} v_{d2} \\ v_{q2} \end{pmatrix} \right\}$$

As for the 4th cycle in FIG. 6B, only the Vec2 is used, then the expression is the same as the expression (14).

In a case of the 1st cycle in FIG. 6C, the current variation is represented by an expression (16). Although S is 3 (5=0.3) in FIG. 6C, in the same manner as the 1st cycle in FIG. 6B, the expression is the same form as the expression (12).

[Expression 16]

$$\begin{pmatrix} \Delta i_d \\ \Delta i_q \end{pmatrix} = T_1 \cdot \left\{ K + B \begin{pmatrix} v_{d1} \\ v_{q1} \end{pmatrix} \right\} + T_2 \cdot \left\{ K + B \begin{pmatrix} v_{d1} \\ v_{q1} \end{pmatrix} \right\} \quad (16)$$

$$= (T_{dead} - (3-1)T_C) \cdot \left\{ K + B \begin{pmatrix} v_{d1} \\ v_{q1} \end{pmatrix} \right\} +$$

$$(3 \cdot T_C - T_{dead}) \cdot \left\{ K + B \begin{pmatrix} v_{d1} \\ v_{q1} \end{pmatrix} \right\}$$

$$= T_C \cdot \left\{ K + B \begin{pmatrix} v_{d1} \\ v_{q1} \end{pmatrix} \right\}$$

As for the 2nd and 3rd cycles in FIG. 6C, the pre-change voltage vector Vec1 (the Vec1 before the change) is used by the dead time counter, and the expression is the same form as the expression (14).

In a case of the 4th cycle in FIG. 6C, the current variation is an expression (17). Since the dead time Tdead in FIG. 6C is longer than two cycles of the output cycle Tc and shorter than three cycles, (Tdead−2Tc) represents a period of a remainder that occurs by the fact that the dead time Tdead is not divisible by the output cycle Tc, and (3Tc−Tdead) represents (the output cycle−the remainder). Even if S is 3 (S=3), the prediction operation according to the voltage change timing can be performed.

[Expression 17]

$$\begin{pmatrix} \Delta i_d \\ \Delta i_q \end{pmatrix} = T_1 \cdot \left\{ K + B \begin{pmatrix} v_{d1} \\ v_{q1} \end{pmatrix} \right\} + T_2 \cdot \left\{ K + B \begin{pmatrix} v_{d2} \\ v_{q2} \end{pmatrix} \right\} \quad (17)$$

$$= (T_{dead} - (3-1)T_C) \cdot \left\{ K + B \begin{pmatrix} v_{d1} \\ v_{q1} \end{pmatrix} \right\} +$$

$$(3 \cdot T_C - T_{dead}) \cdot \left\{ K + B \begin{pmatrix} v_{d2} \\ v_{q2} \end{pmatrix} \right\}$$

$$= (T_{dead} - 2T_C) \cdot \left\{ K + B \begin{pmatrix} v_{d1} \\ v_{q1} \end{pmatrix} \right\} +$$

$$(3T_C - T_{dead}) \cdot \left\{ K + B \begin{pmatrix} v_{d2} \\ v_{q2} \end{pmatrix} \right\}$$

Hence, in all cases of FIGS. 6A, 6B and 6C, the current variation (the amount of the current change) can be properly determined regardless of the presence or absence of the change of the output voltage during the output cycle Tc. Therefore, on the basis of the dead time counter and the expressions (9) and (10), the proper current prediction operation that takes account of the dead time Tdead can be performed.

In the expressions (12) to (17), K of the second period (2) was treated as the same as that of the first period (1). However, since the value of K actually changes depending on the current value, recalculation is required. An accurate current prediction operation that takes this into consideration is shown in expressions (18) and (19). Predicted currents id(n+a+1) and iq(n+a+1) output cycle one cycle ahead from dq-axis currents id(n+a) and iq(n+a) of a certain time are derived. Here, a is an integer that represents time treated in the prediction operation. id' and iq' represent a d-axis current the first period (1) ahead from a certain time (n+a) and q-axis current the first period (1) ahead from a certain time (n+a) respectively.

Here, vd1, vq1, vd2 and vq2 are set as more general settings than those based on the above Vec1 and Vec2. vd1 and vq1 are dq-axis voltages of the first period (1) based on the (assumed) voltage vector that takes account of the dead time Tdead in the corresponding output cycle, and vd2 and vq2 are dq-axis voltages of the second period (2).

[Expression 18]

$$\begin{pmatrix} i'_d \\ i'_q \end{pmatrix} = \begin{pmatrix} i_d(n+a) \\ i_q(n+a) \end{pmatrix} = T_1 \left\{ A \begin{pmatrix} i_d(n+a) \\ i_q(n+a) \end{pmatrix} + B \begin{pmatrix} v_{d1} \\ v_{q1} \end{pmatrix} + e_\psi \right\} \quad (18)$$

$$= \begin{pmatrix} i_d(n+a) \\ i_q(n+a) \end{pmatrix} + (T_{dead} - (S-1)T_C) \left\{ A \begin{pmatrix} i_d(n+a) \\ i_q(n+a) \end{pmatrix} + B \begin{pmatrix} v_{d1} \\ v_{q1} \end{pmatrix} + e_\psi \right\}$$

[Expression 19]

$$\begin{pmatrix} i_d(n+a+1) \\ i_q(n+a+1) \end{pmatrix} = \begin{pmatrix} i'_d \\ i'_q \end{pmatrix} + T_2 \left\{ A \begin{pmatrix} i'_d \\ i'_q \end{pmatrix} + B \begin{pmatrix} v_{d2} \\ v_{q2} \end{pmatrix} + e_\psi \right\} \quad (19)$$

$$= \begin{pmatrix} i'_d \\ i'_q \end{pmatrix} + (ST_C - T_{dead}) \left\{ A \begin{pmatrix} i'_d \\ i'_q \end{pmatrix} + B \begin{pmatrix} v_{d2} \\ v_{q2} \end{pmatrix} + e_\psi \right\}$$

here, $A = \begin{pmatrix} -\frac{R}{L_d} & \omega_r \frac{L_q}{L_d} \\ -\omega_r \frac{L_d}{L_q} & -\frac{R}{L_q} \end{pmatrix}$, $B = \begin{pmatrix} \frac{1}{L_d} & 0 \\ 0 & \frac{1}{L_q} \end{pmatrix}$, $$e_\psi = \begin{pmatrix} 0 \\ -\frac{1}{L_q} \omega_r \psi \end{pmatrix}, \quad \frac{T_{dead}}{T_C} \le S < \frac{T_{dead}}{T_C} + 1 \quad (S \in Z, S \ge 0)$$

The above is the operation example for each constant setting. With the above, all descriptions of the current prediction operation that takes account of the dead time are completed.

In the following, the configuration of the MPC 2 having the current prediction operation with the output cycle divided into two will be described.

Figure 7:
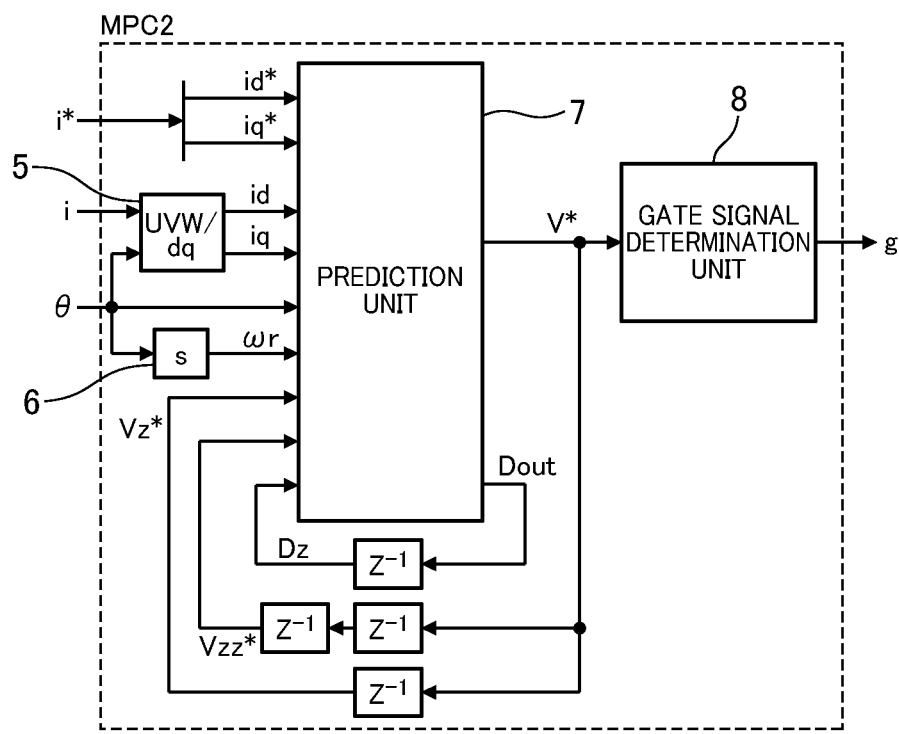
FIG. 7 is a block diagram showing an MPC in the embodiments 1 and 3.

FIG. 7 illustrates a block diagram of the MPC 2 of the embodiment 1. For the sake of convenience, the command current i* is divided into a command d-axis current id* and a command q-axis current iq*. A three-phase/two-phase conversion unit 5 converts the three-phase detection currents i into a detection d-axis current id and a detection q-axis current iq based on the detection phase θ by UVW/dq conversion.

A differentiator 6 differentiates or pseudo-differentiates the detection phase θ, and outputs a detection electrical angular velocity ωr.

A prediction unit 7 inputs the command d-axis current id*, the command q-axis current iq*, the detection d-axis current id, the detection q-axis current iq, the detection phase θ, the detection electrical angular velocity ωr, a command voltage vector last value Vz*, a command voltage vector value Vzz* before last, and a dead time counter last value Dz. The prediction unit 7 performs evaluation of the prediction operation of the current and a prediction result, and outputs a command voltage vector V* that is next and subsequent output voltage vector (s). Also, the prediction unit 7 outputs, as an output dead time counter Dout, a counter value concerning the same time as the command voltage vector V*.

The command voltage vector V* is delayed once and input to the prediction unit 7 as the command voltage vector last value Vz*, also is delayed twice and input to the prediction unit 7 as the command voltage vector value Vzz* before last, then used for next and subsequent prediction operation. The output dead time counter Dout is delayed once and input to the prediction unit 7 as the dead time counter last value Dz, then used for next prediction operation.

A gate signal determination unit 8 determines the gate signal g for outputting a voltage expressed by the command voltage vector V* from the inverter 3 based on the circuit configuration of the power conversion system, and performs insertion of the dead time. In the present embodiment 1, a configuration of the gate signal determination unit 8 is not particularly limited as long as the gate signal g is within a range in which the voltage according the command voltage vector V* is output. Then, the gate signal g becomes an output of the MPC 2.

The important thing in FIG. 7 is that the prediction unit 7 dynamically performs the current prediction operation and determines and outputs the voltage vector, and the configuration is not limited to FIG. 7. For instance, a configuration using an estimated electrical angular velocity without using the detection electrical angular velocity (or is also allowed.

Figure 8:
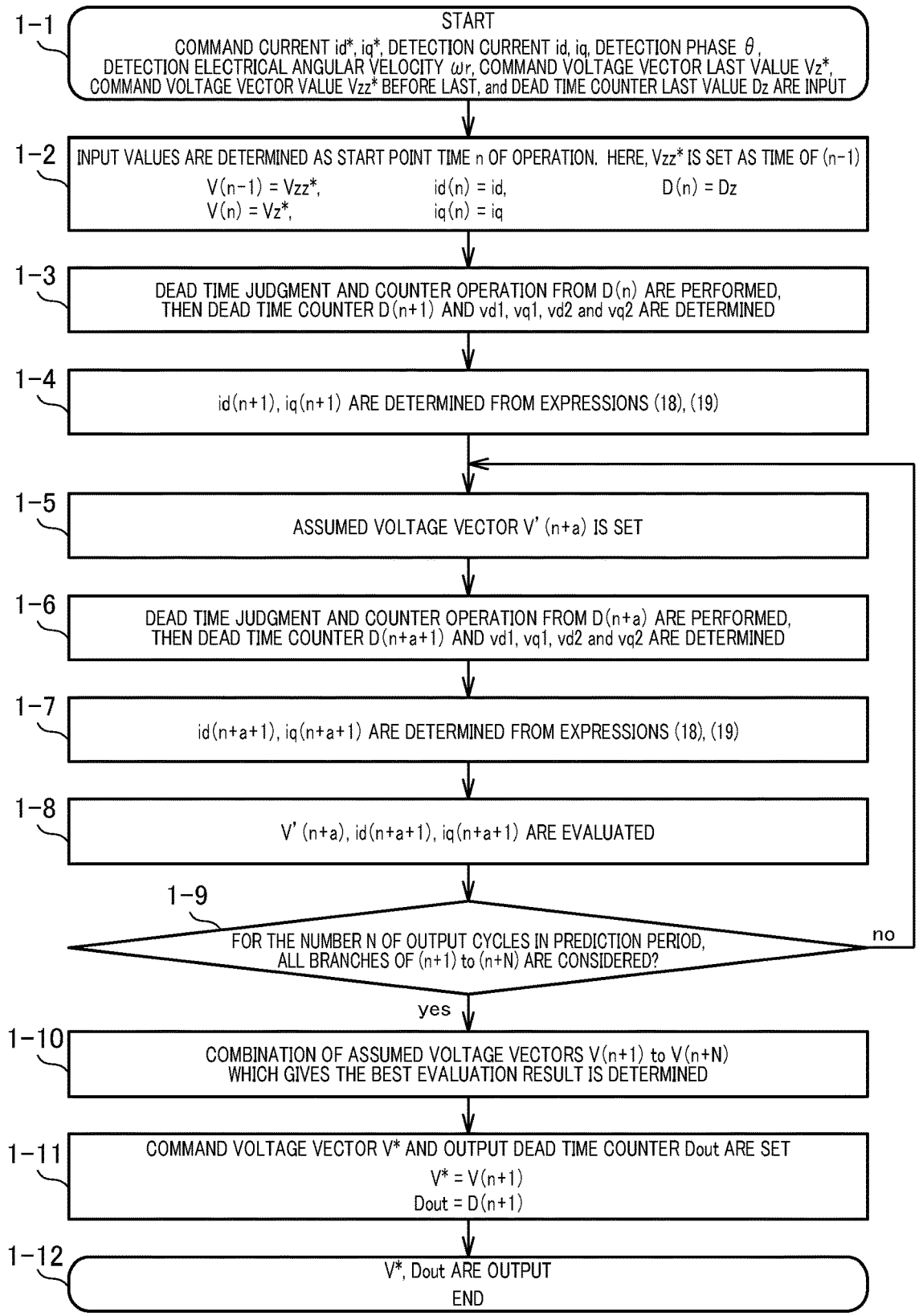
FIG. 8 is a flow chart showing process of a prediction unit in the embodiment 1.

FIG. 8 is a flow chart showing process of the prediction unit 7. In the flow chart shown in FIG. 8, the following processes are performed.

A) A current change due to a voltage vector commanded last time is predicted by the current prediction operation.
B) A voltage vector (s) of next and subsequent output cycles) is assumed.
C) A current change due to the assumed voltage vector is predicted by the current prediction operation.
D) A predicted current and the assumed voltage vector are evaluated.
E) A voltage vector with a good evaluation result is adopted, and is output.

Processes A and C are the essence of the present embodiment 1, and the current prediction operation for dividing the output cycle into two is performed in these processes. 13, D and E are basic processes in the MPC.

At 1-1, the command d-axis current id*, the command q-axis current iq*, the detection d-axis current id, the detection q-axis current iq, the detection phase θ, the detection electrical angular velocity ωr, the command voltage vector last value Vz*, the command voltage vector value Vzz* before last, and the dead time counter last value Dz are input.

At 1-2, the input values are substituted for respective variables as a start point time n of the operation. More specifically, V(n−1)=Vzz*, V(n)=Vz*, id (n)=id, iq (n)=iq, and D(n)=Dz. Here, since the command voltage vector value Vzz* before last is a value before last, it is set at time of (n−1).

At 1-3, the dead time judgment is performed, and on the basis this result, from the dead time counter D(n) a counter value up to next time (n+1) is operated, and a dead time counter D(n+1) is obtained. Further, using information of the dead time counters D(n) and D(n+1), the voltage values vd1, vq1, vd2 and vq2 of the periods obtained by dividing the output cycle into two are calculated. At this time, information on the phase θ(n) is used as appropriate.

Process of the above 1-3 is mathematically expressed more concretely. Here, the dead time counter must be provided for each phase. Values obtained by extracting specific one phase from the voltage vector and the dead time counter are expressed as Vx(n) and Dx(n). When using UVW-phases, V(n) is (Vu(n) Vv(n) Vw(n)) (i.e. V(n)=(Vu(n) Vv(n) Vw(n))). That is, when the voltage vector V(n) is (1 0 0), Vu(n)=1, and when the voltage vector V(n) is (0 1 0), Vu(n)=0, etc.

When considering U-phase, as expressed by an expression (20), from the current polarity and the (assumed) voltage vector change, the dead time counter is set. Here, Dx' is the dead time counter of the first period (1), and Dx(n+a) obtained by performing counter-subtraction from Dx'(n+a) is the dead time counter of the second period (2). Here, a is an integer that is 0 or greater, and in the process of above 1-3, a is 0 (a=0). The set value S can be set by the above expression (9). It is noted that in order to use Dx(n+a) for the dead time counter operation of next cycle, its value needs to be held together with the assumed voltage vector.

A dead time judgment value jdeadx is a setting by which when the dead time judgment value jdeadx is 1, the output voltage changes with a delay by dead time. Although the judgment is performed by the same dead time judgment as that described above, since consideration about whether the voltage vector changes or not depending on the cases of Dx'(n+a) is included, the judgment is performed by only a voltage vector Vx(n+a) this time and the current polarity.

Although the dead time counter is separately treated for the first period (1) and for the second period (2) here, a purpose of this operation is to perform the current prediction operation for dividing the output cycle into two using the dead time counter. Therefore, a detailed operation method is not limited to this.

That is, when the dead time is judged by the dead time judgment, a d-axis voltage Vd1 and a q-axis voltage Vq1 of the first period (1) in the switching cycle, which is the set value S in number, of the output voltage are set to a d-axis voltage Vd and a q-axis voltage Vq before change of the (assumed) voltage vector respectively, and the d-axis voltage Vd1 and the q-axis voltage Vq1 of the first period (1) after this switching cycle of the output voltage are set to a d-axis voltage Vd and a q-axis voltage Vq after the change of the (assumed) voltage vector respectively. A d-axis voltage Vd2 and a q-axis voltage Vq2 of the second period (2) in the switching cycle, which is the set value (S−1) in number, of the output voltage are set to a d-axis voltage Vd and a q-axis voltage Vq before the change of the (assumed) voltage vector respectively, and the d-axis voltage Vd2 and the q-axis voltage Vq2 of the second period (2) after this switching cycle of the output voltage are set to a d-axis voltage Vd and a q-axis voltage Vq after the change of the (assumed) voltage vector respectively.

If the above conditions are satisfied, the dead time counter can be common or separate for the first period (1) and for the second period (2), and a detailed operation method of the dead time counter is not limited to the expressions (20) to (22).

[Expression 20]

$$D'_X(n+a) = \begin{cases} S & (V_X(n+a) \neq V_X(n+a-1) \text{ also } j_{deadX} = 1) \\ 0 & (V_X(n+a) \neq V_X(n+a-1) \text{ also } j_{deadX} = 0) \\ D_X(n+a-1) & (V_X(n+a) = V_X(n+a-1)) \end{cases} \quad (20)$$

[Expression 21]

$$j_{deadX} = \begin{cases} 1 & (V_X(n+a) = 1 \text{ also } i_X \geq 0) \\ 0 & (V_X(n+a) = 0 \text{ also } i_X < 0) \end{cases} \quad (21)$$

[Expression 22]

$$D_X(n+a) = \begin{cases} D'_X(n+a) - 1 & (D'_X(n+a) > 0) \\ 0 & (D'_X(n+a) = 0) \end{cases} \quad (22)$$

With regard to the current polarity, when performing prediction of a forward output cycle, there is a possibility that positive/negative of the detection current will be different from positive/negative of that output cycle. For this, for instance, by using expressions (23) to (25), phase angles θiu, θiv and θiw of the three-phase currents are obtained, then positive/negative of the current can be considered. This θiu(n+a) can be calculated as a phase of a sine wave, and the current value is positive when the phase is 0 or more and less than n, and the current value is negative when the phase is n or more and less than 2n.

As a result of the operation, if the θiu, θiv and θiw are not in a range of 0 or more and less than 2π, by appropriately increasing or decreasing 2π, an equivalent judgment can be made. Here, in this judgment, there is a risk that positive/negative judgment will become inaccurate in the vicinity of switching of positive/negative, i.e. in the vicinity of phases 0, 2π and π. In this regard, the above dead time judgment value jdeadx is made to become 0 in specific ranges in the vicinity of phases 0, 2π and π, or the operation of 1-4 is performed after multiplying after-mentioned voltages vd1, vq1, vd2 and vq2 by a gain of 0 or more and less than 1 which is determined by values of the phase angles θiu, θiv and θiw, then a dead zone process may be provided for the phase.

[Expression 23]

$$\theta_{iU}(n+a) = \theta(n+a) + \arctan\left(\frac{i_q(n+a)}{i_d(n+a)}\right) + \frac{\pi}{2} \quad (23)$$

[Expression 24]

$$\theta_{iV}(n+a) = \theta_{iU}(n+a) - \frac{2\pi}{3} \quad (24)$$

[Expression 25]

$$\theta_{iW}(n+a) = \theta_{iU}(n+a) - \frac{4\pi}{3} \quad (25)$$

Here, a phase θ(n+a) is determined as expressed by an expression (26) with consideration given to a rotational phase angle in the output cycle. A phase for rotation by the detection angular velocity ωr is added to the detection phase θ. Here, Tc is the output cycle, and Lθ is a phase adjustment term for setting an arbitrary time in the output cycle as a phase reference, which is determined by an expression (27). In a case of Lθ=Tc/2, an intermediate time of the output cycle Tc is the phase reference.

[Expression 26]

$$\theta(n+a)=\theta+(a+L_\theta)T_c\cdot\omega_r \quad (26)$$

[Expression 27]

$$0 \leq L_\theta \leq 1 \quad (27)$$

By referring the dead time counters Dx'(n+a) and Dx(n+a), voltages used for the current prediction operation can be determined as expressed by expressions (28) to (33). Here, vd1 and vq1 are the d-axis voltage and the q-axis voltage of the first period (1), and vd2 and vq2 are the d-axis voltage and the q-axis voltage of the second period (2). The first period (1) and the second period (2) are the periods obtained by dividing the output cycle Tc, and since a short time width is generally assumed, the dq-axis voltages are generated with the electrical phase angle θ(n+a) being common. However, the phase may be separately calculated and used for each of the first period (1) and the second period (2) with the start point time and the intermediate time etc. being a reference.

[Expression 28]

$$V_{1X}(n+a) = \begin{cases} V'_X(n+a-1-S+D'_X(n+a)) & (D'_X(n+a) > 0) \\ V'_X(n+a) & (D'_X(n+a) = 0) \end{cases} \quad (28)$$

[Expression 20]

$$V_1(n+a) = (V_{1U}(n+a) \quad V_{1V}(n+a) \quad V_{1W}(n+a)) \quad (29)$$

[Expression 30]

$$V_{2X}(n+a) = \begin{cases} V'_X(n+a-S+D_X(n+a)) & (D_X(n+a) > 0) \\ V'_X(n+a) & (D_X(n+a) = 0) \end{cases} \quad (30)$$

[Expression 31]

$$V_2(n+a) = (V_{2U}(n+a) \quad V_{2V}(n+a) \quad V_{2W}(n+a))$$

[Expression 32]

$$\begin{pmatrix} v_{d1} \\ v_{q1} \end{pmatrix} = \begin{pmatrix} \cos(\theta(n+a)) & \sin(\theta(n+a)) \\ -\sin(\theta(n+a)) & \cos(\theta(n+a)) \end{pmatrix} \cdot \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} V_1(n+a)^T \quad (32)$$

[Expression 33]

$$\begin{pmatrix} v_{d2} \\ v_{q2} \end{pmatrix} = \begin{pmatrix} \cos(\theta(n+a)) & \sin(\theta(n+a)) \\ -\sin(\theta(n+a)) & \cos(\theta(n+a)) \end{pmatrix} \cdot \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} V_2(n+a)^T \quad (33)$$

The above is the process of 1-3.

At 1-4, the current change is predicted using the expressions (18) and (19). In a case of 1-4, a becomes 0 (a=0). As described above, by the expressions (18) and (19), the current prediction operation for dividing the output cycle Tc into two of the first period (1) and the second period (2) is performed. The above 1-2 to 1-4 correspond to the process of A of the above A to E.

At 1-5, an assumed voltage vector V' (n+a) is set. Here, voltage vector (s) of next and subsequent cycles is assumed, and a is 1 or more. Although the voltage vector is assumed according to the target circuit configuration, since it is possible to consider independently of the essence of the present invention, the voltage vector can be assumed by an arbitrary determining method. For instance, it may be a method in which one voltage vector is selected from among four types of a case where a change of one phase or less is allowed in the two-level inverter. 1-5 corresponds to the above process B.

At 1-6, on the basis of the assumed voltage vector, the dead time counter is determined, and dq-axis voltages are calculated. These are done by appropriately substituting (n+a) part according to the target voltage vector in the above expressions (20) to (33). In these calculations, the assumed voltage vector V'(n+a) may be replaced with V(n+a).

At 1-7, the current change is predicted using the expressions (18) and (19). This operation is the same as that at 1-4 except that time treated or used at 1-4 is different from that at 1-7. 1-6 and 1-7 correspond to the above process C.

At 1-8, the evaluation of the assumed voltage vector and the predicted current is made. Regarding the evaluation, as the same as 1-5, since it is possible to consider independently of the essence of the present invention, an arbitrary evaluation function may be used. For instance, as expressed by expressions (34) to (37), a deviation between the command current and the predicted current and the presence or absence of the voltage vector change may be indices of the evaluation. J is an evaluation function. J is set so that when the current deviation is great or the voltage vector change is present (there is a switching), that is, when the evaluation is an undesirable result, a value of J is great. Therefore, if J is small, a good result is given.

Here, Wid, Wiq and Wv are weight coefficients for adjusting priority of the indices of the evaluation, and N is the number of the output cycles in the prediction period. In the actual process of 1-8, only a value for the operation of this time (n+a) is added to a value of the evaluation function J up to last time, and it is given to next time (n+a+1). Here, also in the expression (37), as same as 1-6, it is considered that V'(n+a) is replaced with V(n+a). 1-8 corresponds to the above process D.

[Expression 34]

$$J = W_{id}J_{id} + W_{iq}J_{iq} + W_v J_v \quad (34)$$

[Expression 35]

$$J_{id} = |i_d^* - i_d(n+1)| + |i_d^* - i_d(n+2)| + \ldots + |i_d^* - i_d(n+N)| \quad (35)$$

[Expression 36]

$$J_{iq} = |i_q^* - i_q(n+1)| + |i_q^* - i_q(n+2)| + \ldots + |i_q^* - i_q(n+N)| \quad (36)$$

[Expression 37]

$$J_v = Q_v(n+1) + Q_v(n+2) + \ldots + Q_v(n+N) \text{ here,} \quad (37)$$

$$Q_v = \begin{cases} 0 & (V(n+a-1) = V(n+a)) \\ 1 & (V(n+a-1) \neq V(n+a)) \end{cases}$$

At 1-9, a check is made as to whether or not all branches to be considered of the voltage vector have been operated. For the number N of the output cycles in the prediction period, if assumed voltage vector branches up to time of (n+N) are considered, all branches have been operated, then the routine proceeds to 1-10. If all branches have not been operated yet, the routine is returned to 1-5, and a new assumed voltage vector is set. 1-9 corresponds to the above process 13.

At 1-10, a combination of the assumed voltage vectors V'(n+1) to V'(n+N) which gives the best evaluation among the evaluation results operated at 1-8 is determined as output voltage vectors V(n+1) to V(n+N). At this time, the dead time counter is made to be identical with a counter for the determined output voltage vector. It is noted that since the actual output in the present embodiment 1 is done only at time (n+1), a configuration in which only a value about (n+1) is held may be possible.

At 1-11, the output voltage vector V(n+1) of next cycle is substituted for the command voltage vector V*, and the dead time counter D(n+1) of next cycle is substituted for the output dead time counter Dout.

At 1-12, the command voltage vector V* and the output dead time counter Dout are output 1-10, 1-11 and 1-12 correspond to the above process E.

The above is the operation of the flow chart of FIG. 8, and on the basis of this operation, the current prediction operation with the output cycle Tc divided into two can be performed. The important point of this flow chart is that the current prediction operation with the output cycle divided into two is performed, and a detailed configuration is not limited to FIG. 8.

In the following, the operation of the flow chart of FIG. 8 will be verified with an emphasis on the dead time counter.

Figure 9:
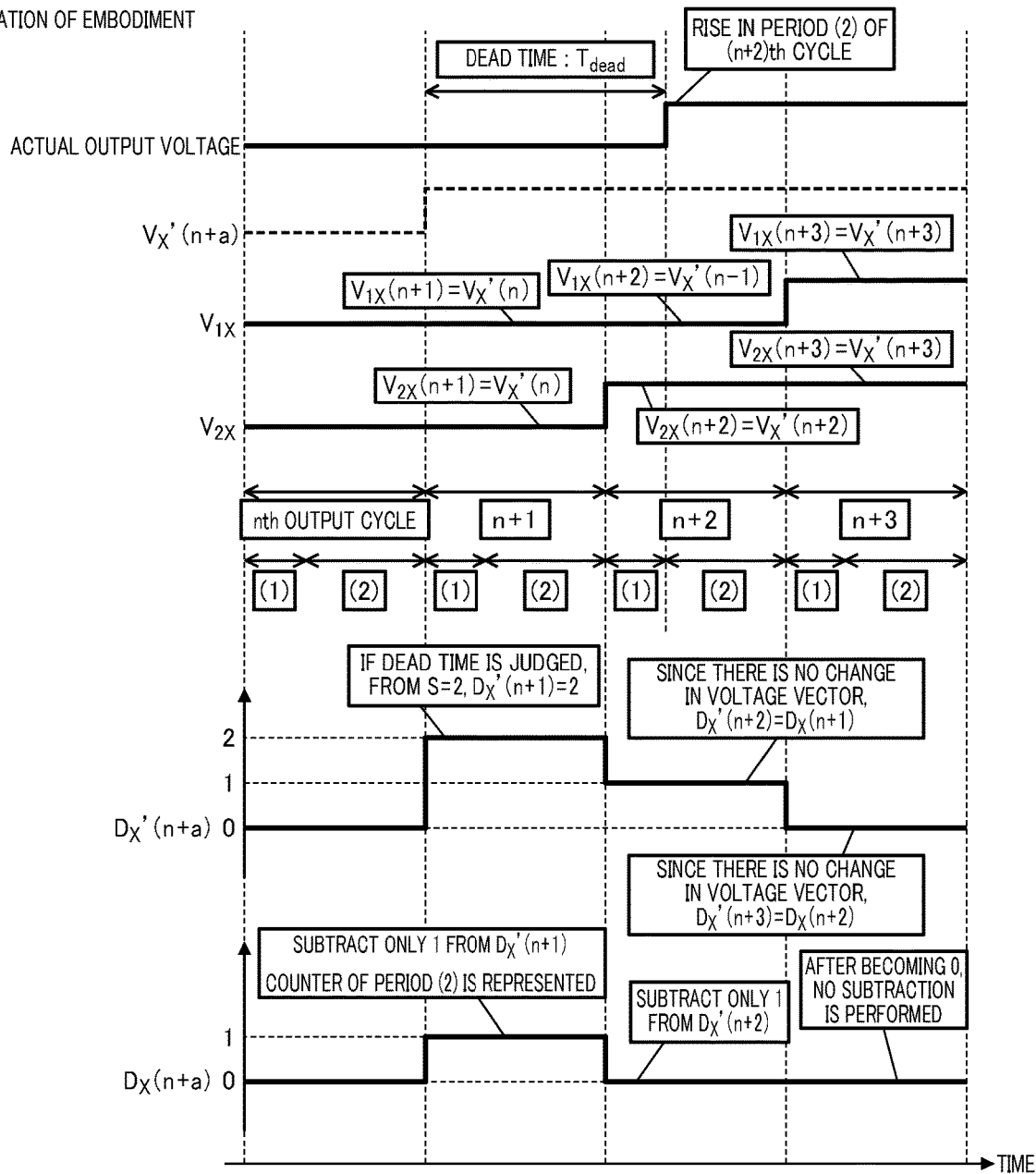
FIG. 9 is a drawing showing an example of operation of the flow chart of FIG. 8.

FIG. 9 illustrates an example of the operation of the flow chart of FIG. 8. The drawing here illustrates the operation for one phase in the case where the dead time Tdead is equal to or greater than one time the output cycle Tc and less than double the output cycle Tc, i.e. in the case of S=2 which is from the expression (9).

In FIG. 9, in a case where while the assumed voltage vector Vx' changes at time of (n+1), the output voltage changes with a delay by the dead time, V1x and V2x used for the current prediction operation are expressed with a delay by the dead time.

At time n, as an initial condition, a state of the dead time counter is 0.

Since the assumed voltage vector changes at time (n+1), the dead time judgment according to the current polarity is performed. In the case of FIG. 9, a case where the voltage change is delayed, i.e. the dead time counter needs to be set, is assumed.

With respect to the setting of the dead time counter, the set value S is set to D'(n+1). In the case of FIG. 9, from S=2, 2 is substituted. Since ID'(n+1) is 1 or more, a value obtained by subtracting only 1 from D'(n+1) is substituted for D(n+1). D'(n+1) corresponds to a voltage V1x(n+1) of the first period (1), and D(n+1) corresponds to a voltage V2x(n+1) of the second period (2).

On the basis of the expressions (28) and (30), V1x(n+1) and V2x(n+1) are determined as expressed by expressions (38) and (39). A voltage vector of time n that is time before the change is selected. After determining V1x(n+1) and V2x(n+1), dq-axis voltages are obtained by the expressions (32) and (33), and the current prediction operation is performed by the expressions (18) and (19). In the same manner as this, V1x(n+1) and V2x(n+1) of other times are also determined.

[Expression 38]

$$V_{1X}(n+1) = V'_X(n+1-1-S+D'_X(n+1)) \qquad (38)$$
$$= V'_X(n+1-1-2+2)$$
$$= V'_X(n)$$

[Expression 39]

$$AV_{2X}(n+1) = V'_X(n+1-S+D_X(n+1)) \qquad (39)$$
$$= V'_X(n+1-2+1)$$
$$= V'_X(n)$$

At time (n+2), since there is no change in the assumed voltage vector, D'(n+2) inherits the value of D(n+1). Then, D(n+2) becomes a value obtained by subtracting only 1 from the D'(n+2). At this time, D(n+2) is 0, and on the basis of the expressions (28) and (30), V1x(n+2) and V2x(n+2) are determined as expressed by expressions (40) and (41). In the first period (1), the voltage vector of time n that is time before the change is selected, whereas in the second period (2), the voltage vector after the change is selected. When seeing the output voltage, the output voltage rises in the second period (2) of the output cycle of time (n+2), and thus it can be understood that the delay of the voltage change by the dead time is certainly reflected in the current prediction operation.

[Expression 40]

$$V_{1X}(n+2) = V'_X(n+2-1-S+D'_X(n+2)) \qquad (40)$$
$$= V'_X(n+1-1-2+1)$$
$$= V'_X(n)$$

[Expression 41]

$$V_{2X}(n+2) = V'_X(n+2) \qquad (41)$$

At time (n+3), since there is no change in the assumed voltage vector, D'(n+3) inherits the value of D(n+2). D'(n+3) then becomes 0, and as the voltage vector of the first period (1), the assumed voltage vector of the same time is selected. With regard to D(n+3), when D'(n+3) is already 0, no subtraction is performed. Therefore, 0 is substituted for D(n+3). On the basis of the expressions (28) and (30), V1x(n+3) and V2x(n+3) are determined as expressed by expressions (42) and (43).

[Expression 42]

$$V_{1X}(n+3) = V_{X'}((n+3)) \qquad (42)$$

[Expression 43]

$$V_{2X}(n+3) = V_{X'}(n+3) \qquad (43)$$

Although the operation in FIG. 9 focuses on one phase, the operation is actually performed for all existing phases.

As described above, the flow chart of FIG. 8 operates equivalently to the current prediction operation by the above dead time counter, and can take account of the delay of the voltage change by the dead time by the current prediction operation.

After determining the output voltage vector based on the flow chart of FIG. 8, as shown in FIG. 7, the gate signal determination unit 8 determines the gate signal g so that the output voltage according to the output voltage vector is obtained, and outputs the gate signal g. Although the gate signal g is set according to the circuit configuration, since it is possible to consider independently of the essence of the present invention, the gate signal g could be set by an arbitrary setting method. In the case of the two-level inverter, since the gate signal g can be uniquely set from the output voltage vector, the voltage vector and the gate signal g are made to be simply correlated with each other.

The above is the configuration of the MPC 2 having the current prediction operation with the output cycle divided into two. By performing the current control by the MPC 2 based on this configuration, decrease in current prediction accuracy and increase in the number of times of switching due to the dead time can be prevented.

As described above, according to the present embodiment 1, by performing the MPC performing the current prediction with the switching cycle of the output voltage being divided into two on the basis of FIGS. 7 and 8, the control that can achieve high current control performance and low switching frequency can be performed.

In addition, as compared with the prior art documents, the present embodiment 1 has the advantage of having the effects without being affected by the ratio between the dead time and the switching cycle of the output voltage.

Embodiment 2

In the embodiment 1, the effects of the current prediction operation with the output cycle divided into two are described, and the configuration of the MPC 2 for performing that current prediction operation is shown. In the embodiment 1, the output cycle and the operation cycle are regarded as having the same length, and only the voltage vector for one cycle of the output cycle is set in one operation.

However, if the output cycle is shortened to the extent of the dead time in this configuration, the operation cycle is also shortened to the extent of the dead time. It is preferable that the MPC 2 assume a number of voltage vectors and predict currents over a longer period. Therefore, it is required to set the operation cycle to be long and to withstand a number of current prediction operations. If the output cycle is set to be long in order to keep the operation cycle long, division (or split) of the pulse width becomes rough, and this leads to decrease in current control performance. Therefore, a configuration in which the output cycle is kept short to the extent of the dead time and the operation cycle is kept long is required.

In the present embodiment 2, consider a configuration in which voltage vectors for a plurality of output cycles are determined in operation cycle one cycle, and a voltage vector of a corresponding time is read in each output cycle from a plurality of voltage vector information.

By using this configuration, the operation cycle can be kept at a length of several times that of the output cycle while keeping the output cycle short. In the following, the operation cycle is Tcalc, and the output cycle is Tc, then as expressed by an expression (44), by the number Ncalc of the output cycles in the operation cycle Tcalc, its ratio is determined. Ncalc is a natural number of 2 or more.

[Expression 44]

$$T_{calc} = N_{calc} \cdot T_c \quad (44)$$

A system configuration is the same as that in the embodiment 1 (FIG. 1).

Figure 10:
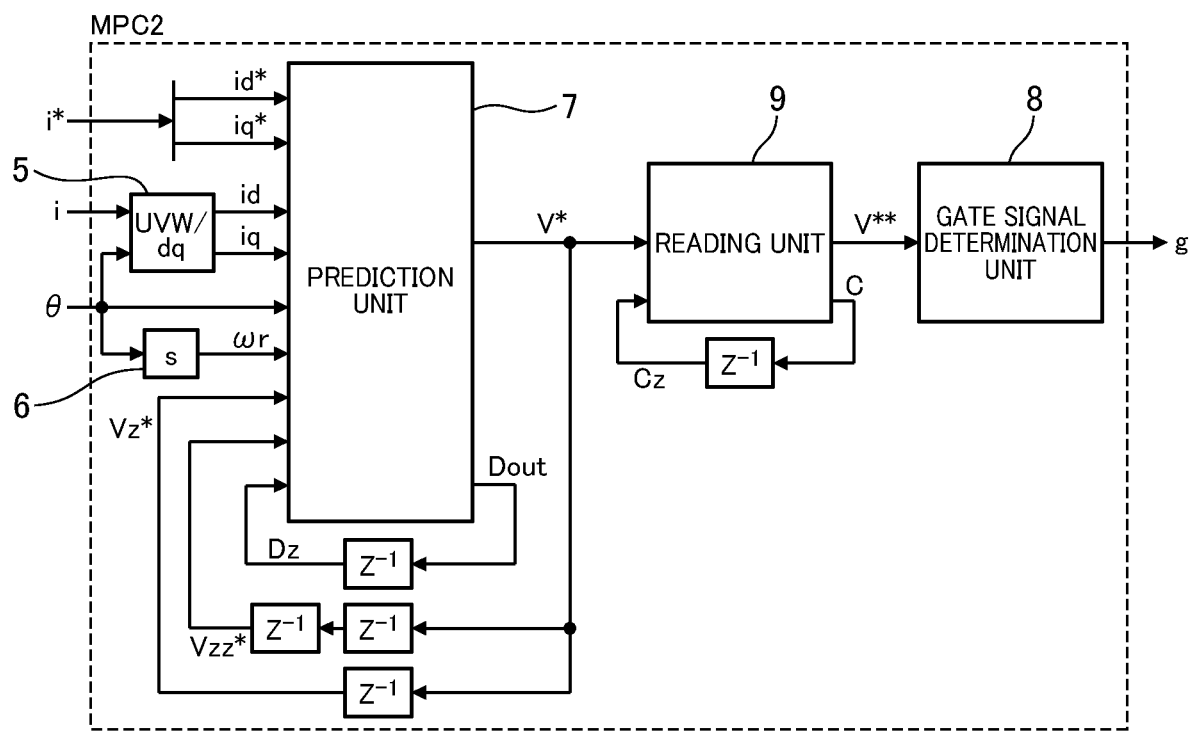
FIG. 10 is a block diagram showing an MPC in the embodiments 2 and 4.

FIG. 10 illustrates a block diagram of the MPC 2 of the embodiment 2. As illustrated in FIG. 10, in the MPC 2 of the present embodiment 2, a reading unit 9 is added to the configuration of FIG. 7, and input/output information of the prediction unit 7 is changed. To treat voltage vector information for Ncalc cycles, the command voltage vector is output as a matrix value in which Ncalc are arranged. Therefore, V* is referred to as a command voltage vector matrix. Likewise, the last value Vz* and the value Vzz* before last are also matrixes each having Ncalc pieces of voltage vector information. Although V* is input to the gate signal determination unit 8 in the embodiment 1, V* is input to the reading unit 9 in the present embodiment 2.

The reading unit 9 outputs, based on input of the command voltage vector matrix V* and a reading counter last value Cz, an output voltage vector V and a reading counter value C. The reading counter value C is delayed once and input to the reading unit 9** as the reading counter last value Cz, and is used for next operation.

The gate signal determination unit 8 determines the gate signal g for outputting a voltage expressed by the output voltage vector V from the inverter 3 based on the circuit configuration of the power conversion system. The above is a change point from the embodiment 1. The other configurations are the same as those of FIG. 7** of the embodiment 1.

Here, the reading unit 9 operates by or at an interrupt of the switching cycle of the output voltage, whereas the predict ion unit 7 operates by or at an interrupt cycle in which a plurality of cycles of the reading unit 9 are set as one cycle. It is noted that the command voltage vector matrix last value Vz*, the command voltage vector matrix value Vzz* before last and the dead time counter last value Dz are one-time delay of the cycle of the prediction unit 7, and the reading counter last value Cz is one-time delay of the cycle of the reading unit 9.

The important thing in FIG. 10 is that the prediction unit 7 dynamically performs the current prediction operation and determines and outputs the voltage vectors for a plurality of cycles of the switching cycle of the output voltage by one prediction operation, and the configuration is not limited to FIG. 10.

Figure 11:
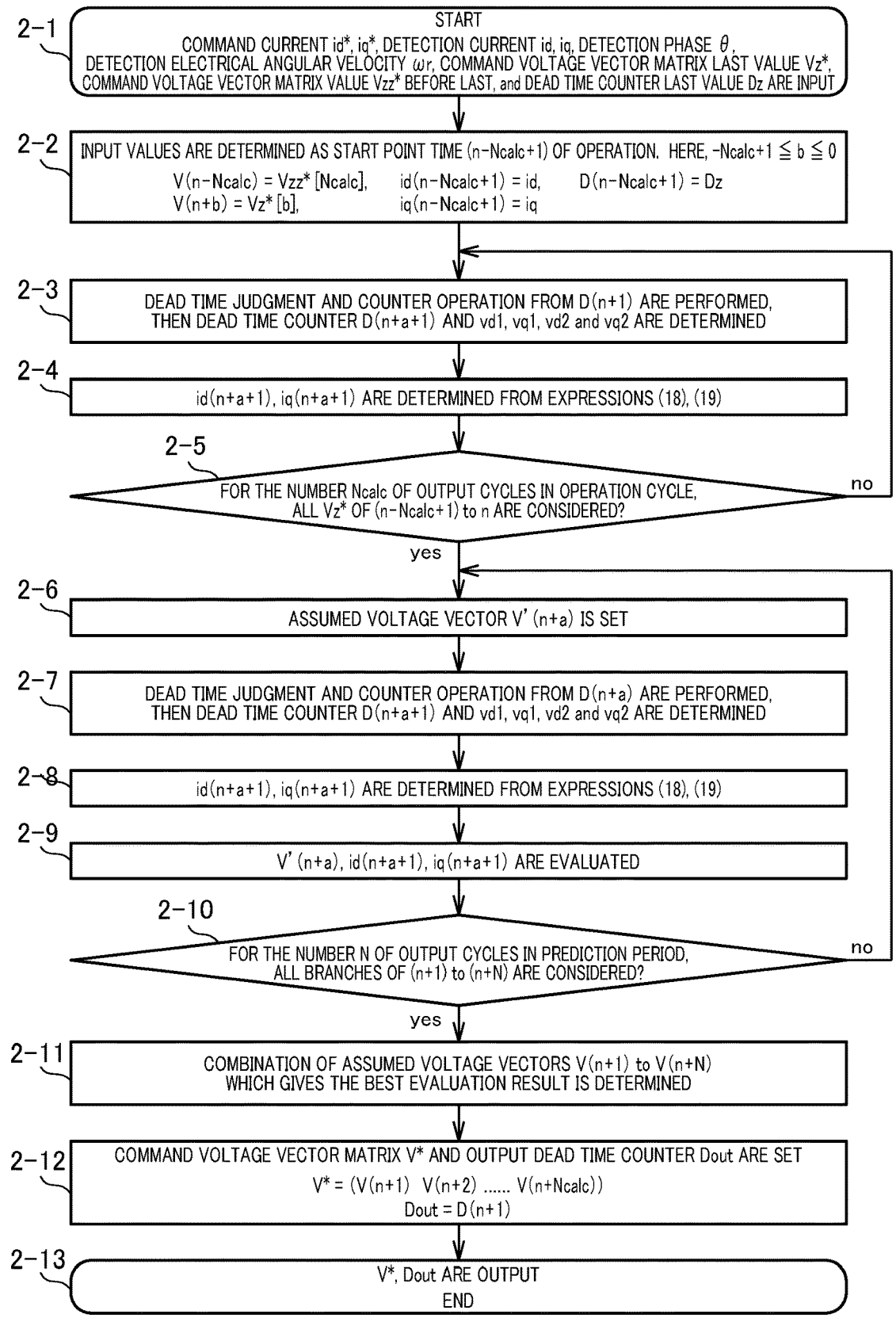
FIG. 11 is a flow chart showing process of a prediction unit in the embodiment 2.

FIG. 11 illustrates a current operation flow chart of the present embodiment 2. FIG. 11 operates at the operation cycle Tcalc. In the flow chart shown in FIG. 11, in the same manner as FIG. 8, the following processes are performed.

A) A current change due to a voltage vector commanded last time is predicted by the current prediction operation.

B) A voltage vector (s) of next and subsequent output cycle (s) is assumed.

C) A current change due to the assumed voltage vector is predicted by the current prediction operation.

D) A predicted current and the assumed voltage vector are evaluated.

E) A voltage vector with a good evaluation result is adopted, and is output.

In the present embodiment 2, contents of A and E are changed from the embodiment 1.

At 2-1, the command d-axis current id*, the command q-axis current iq*, the detection d-axis current id, the detection q-axis current iq, the detection phase θ, the detection electrical angular velocity ωr, the command voltage vector matrix last value Vz*, the command voltage vector matrix value Vzz* before last, and the dead time counter last value Dz are input.

At 2-2, the input values are determined as a start point time (n−Ncalc+1) of the operation. More specifically, V(n−

Ncalc)=Vzz*[Ncalc], V(n+b)=Vz*[b], id(n−Ncalc+1)=id, iq(n−Ncalc+1)=iq, and D(n−Ncalc+1)=Dz. Here, −Ncalc≤b≤0. Discrete operation time here is treated so that a first output cycle after the operation cycle ends corresponds to (n+1)th time. The current and the dead time counter are substituted at the start point time.

Input voltage vector information is information for a plurality of output cycles, and is substituted for the voltage vector of each time. At 2-2, the command voltage vector matrix last value Vz* and the command voltage vector matrix value Vzz* before last are regarded as array values, and the substitution process is performed with an array number. Here, a numerical number in H of the array means that if [1], it indicates 1st element. It is noted that this is different from a case of C language in which [0] indicates 1st.

For the dead time counter operation, since a voltage vector one before (n−Ncalc+1)th is needed, a last command of the value before last is also substituted as (n−Ncalc)th. In this regard, a resister number may be reduced in such a way as to exchange the voltage vector of the value before last only for the last value.

At 2-3 and 2-4, the dead time counter operation and voltages of the first period (1) and the second period (2) are determined, and using these, the current prediction operation is performed. This is similar to 1-6 and 1-7 in FIG. 8 of the embodiment 1. However, in order for the operation from (n−Ncalc+1)th to nth to be generally represented, in the present embodiment 2, a form is changed so that (n+a+1)th is determined from (n+a)th. a in 2-3 and 2-4 is an integer of (−Ncalc+1) or more and 0 or less.

At 2-5, a check is made as to whether or not all current changes during the operation cycle are considered. If the consideration is not taken into account yet, prediction operation of next time is performed. If all current changes are considered, the routine proceeds to 2-6.

2-2 to 2-5 represent change points of the above A. Unlike the embodiment 1, a plurality of output cycles in the operation cycle are considered from current sampling, and current of nth time which is an initial value when examining next and subsequent voltage vectors) is operated.

At 2-6 to 2-10, a predicted current is operated for the assumed voltage vector (s) of next and subsequent output cycles, and is evaluated. All branches to be considered of the voltage vector in the prediction period are operated. This is the same processes as those at 1-5 to 1-9 in FIG. 8 of the embodiment 1.

At 2-11, voltage vectors with the best evaluation result are determined. This is also the same as 1-10 in FIG. 8 of the embodiment 1. However, in the embodiment 1, at least one voltage vector is determined, whereas in the present embodiment 2, to determine an output of next operation cycle, at least Ncalc voltage vectors are determined.

At 2-12, adopted voltage vectors of times of (n+1)th to (n+Ncalc)th are substituted for the command voltage vector matrix V*. Since the dead time counter is operated at 2-2 to 2-5 in the configuration of the embodiment 2, only (n+1)th is substituted.

As described above, in the processes of 2-11 and 2-12, the number of substitutions is changed from the embodiment 1 by or according to the number Ncalc of the output cycles in the operation cycle. This is a change point of the above E. Here, since the Ncalc voltage vectors are determined, for the number N of the output cycles in the prediction period, a relationship of an expression (45) arises. This expression indicates that predictions of Ncalc or more need to be performed.

[Expression 45]

$$N \geq N_{calc} \quad (45)$$

The above is the operation of the flow chart of FIG. 11. The important point of this flow chart is that the current prediction operation with the output cycle divided into two is performed, and a detailed configuration is not limited to FIG. 11.

Figure 12:
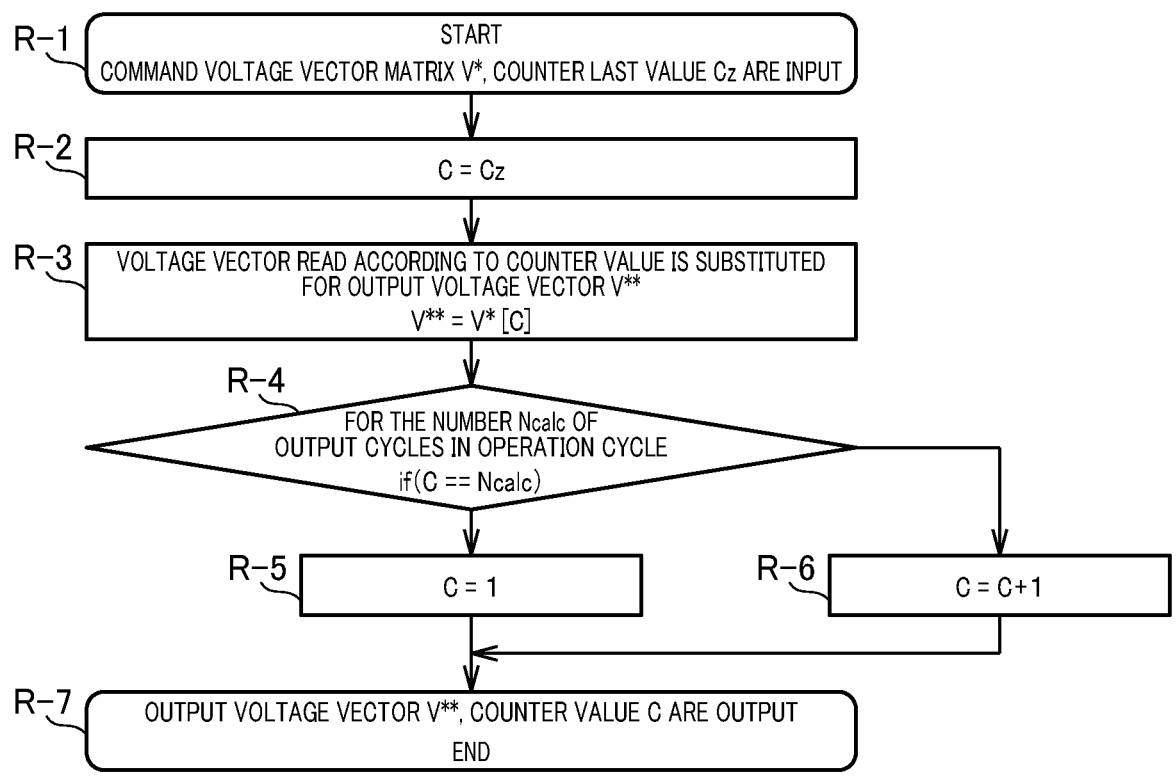
FIG. 12 is a flow chart showing process of a reading unit in the embodiment 2.

FIG. 12 illustrates a flow chart of the reading unit 9 of the present embodiment 2. The reading unit 9 reads one voltage vector from the voltage vector matrix using the counter value. It is noted that the reading unit 9 operates by or at an interrupt of the output cycle Tc, but not at the operation cycle Tcalc of the prediction unit 7. One-time delay of the reading counter value C is also delay of the output cycle Tc. The reading unit 9 operates by the flow chart of FIG. 12.

The flow chart of FIG. 12 will be described. FIG. 12 operates at the output cycle Tc.

At R-1, the command voltage vector matrix V* and the counter last value Cz are input.

At R-2, the counter last value Cz is substituted for the counter value C.

At R-3, cth voltage vector of the command voltage vector matrix V* is substituted for the output voltage vector V.

At R-4, a check is made based on the counter value C. If the counter value C reaches the number Ncalc of the output cycles in the operation cycle, the counter value C is returned to 1 at R-5. If the counter value C is not Ncalc, the counter value C is incremented by 1 at R-6.

At R-7, the output voltage vector V** and the counter value C are output.

In this manner, by setting the counter value part of the command voltage vector matrix V* to the output voltage vector V** while looping the counter value C, one voltage vector can be read from the voltage vectors for a plurality of cycles.

Here, a timing at which the counter last value Cz of the input is 1 and a timing at which the command voltage vector matrix V* is updated are synchronized. It is noted that if this is not followed, the output voltage will be different from the output voltage assumed by the prediction unit 7, which leads to a prediction error.

The important point of this flow chart is that one voltage vector is read in sequence from a plurality of voltage vectors using the counter, and a detailed configuration is not limited to FIG. 12.

The above has described the configuration in which the voltage vectors for the plurality of output cycles are determined in operation cycle one cycle, and the voltage vector of the corresponding time is read in each output cycle from the plurality of voltage vector information. By using this configuration, it is possible to achieve high current control performance with the operation cycle more suitable for implementation than the embodiment 1.

As described above, according to the present embodiment 2, by performing the MPC performing the current prediction for a plurality of cycles of the switching cycle of the output voltage with the switching cycle of the output voltage being divided into two on the basis of FIGS. 10, 11 and 12, the control that can achieve high current control performance, low switching frequency and longer operation time than the embodiment 1 can be performed.

In addition, as compared with the prior art documents, the present embodiment 2 has the advantage of having the effects without being affected by the ratio between the dead time and the switching cycle of the output voltage.

Embodiment 3

In the embodiment 1, the expressions (18) and (19) are used for the current prediction operation with the output cycle divided into the first period (1) and the second period (2). In this operation, accuracy is valued, and a term (s) using the current value in the calculation of the current variation is not regarded as always constant in the output cycle, then the operation of the second period (2) is performed with the current at the end of the first period (1).

However, if time is sufficiently short, even if the term(s) using the current value is regarded as constant in the output cycle, it will not result in a significant error. Therefore, the expressions (18) and (19) could be changed to expressions (46) and (47). The expressions (18) and (19) are shown again, and the expressions (46) and (47) are shown below.

[Expression 18]

$$\begin{pmatrix} i'_d \\ i'_q \end{pmatrix} = \begin{pmatrix} i_d(n+a) \\ i_q(n+a) \end{pmatrix} + T_1 \left\{ A \begin{pmatrix} i_d(n+a) \\ i_q(n+a) \end{pmatrix} + B \begin{pmatrix} v_{d1} \\ v_{q1} \end{pmatrix} + e_\psi \right\} \quad (18)$$

$$= \begin{pmatrix} i_d(n+a) \\ i_q(n+a) \end{pmatrix} + (T_{dead} - (S-1)T_C) \left\{ A \begin{pmatrix} i_d(n+a) \\ i_q(n+a) \end{pmatrix} + B \begin{pmatrix} v_{d1} \\ v_{q1} \end{pmatrix} + e_\psi \right\}$$

[Expression 19]

$$\begin{pmatrix} i_d(n+a+1) \\ i_q(n+a+1) \end{pmatrix} = \begin{pmatrix} i'_d \\ i'_q \end{pmatrix} + T_2 \left\{ A \begin{pmatrix} i'_d \\ i'_q \end{pmatrix} + B \begin{pmatrix} v_{d2} \\ v_{q2} \end{pmatrix} + e_\psi \right\} \quad (19)$$

$$= \begin{pmatrix} i'_d \\ i'_q \end{pmatrix} + (ST_C - T_{dead}) \left\{ A \begin{pmatrix} i'_d \\ i'_q \end{pmatrix} + B \begin{pmatrix} v_{d2} \\ v_{q2} \end{pmatrix} + e_\psi \right\}$$

here, $A = \begin{pmatrix} -\frac{R}{L_d} & \omega_r \frac{L_q}{L_d} \\ -\omega_r \frac{L_d}{L_q} & -\frac{R}{L_q} \end{pmatrix}$, $B = \begin{pmatrix} \frac{1}{L_d} & 0 \\ 0 & \frac{1}{L_q} \end{pmatrix}$, $e_\psi = \begin{pmatrix} 0 \\ -\frac{1}{L_q} \omega_r \psi \end{pmatrix}$, $\frac{T_{dead}}{T_C} \leq S < \frac{T_{dead}}{T_C} + 1$ $(S \in Z, S \geq 0)$

[Expression 46]

$$\begin{pmatrix} i'_d \\ i'_q \end{pmatrix} = \begin{pmatrix} i_d(n+a) \\ i_q(n+a) \end{pmatrix} + T_1 \left\{ A \begin{pmatrix} i_d(n+a) \\ i_q(n+a) \end{pmatrix} + B \begin{pmatrix} v_{d1} \\ v_{q1} \end{pmatrix} + e_\psi \right\} \quad (46)$$

$$= \begin{pmatrix} i_d(n+a) \\ i_q(n+a) \end{pmatrix} + (T_{dead} - (S-1)T_C) \left\{ A \begin{pmatrix} i_d(n+a) \\ i_q(n+a) \end{pmatrix} + B \begin{pmatrix} v_{d1} \\ v_{q1} \end{pmatrix} + e_\psi \right\}$$

[Expression 47]

$$\begin{pmatrix} i_d(n+a+1) \\ i_q(n+a+1) \end{pmatrix} = \begin{pmatrix} i'_d \\ i'_q \end{pmatrix} + T_2 \left\{ A \begin{pmatrix} i_d(n+a) \\ i_q(n+a) \end{pmatrix} + B \begin{pmatrix} v_{d2} \\ v_{q2} \end{pmatrix} + e_\psi \right\} \quad (47)$$

$$= \begin{pmatrix} i'_d \\ i'_q \end{pmatrix} + (ST_C - T_{dead}) \left\{ A \begin{pmatrix} i_d(n+a) \\ i_q(n+a) \end{pmatrix} + B \begin{pmatrix} v_{d2} \\ v_{q2} \end{pmatrix} + e_\psi \right\}$$

These expressions can be simplified as an expression (48). Although a similar expression appeared when describing the current prediction operation by the dead time counter, the following expression is a general form.

[Expression 48]

$$\begin{pmatrix} i_d(n+a+1) \\ i_q(n+a+1) \end{pmatrix} = \begin{pmatrix} i'_d \\ i'_q \end{pmatrix} + (ST_C - T_{dead}) \left\{ A \begin{pmatrix} i_d(n+a) \\ i_q(n+a) \end{pmatrix} + B \begin{pmatrix} v_{d2} \\ v_{q2} \end{pmatrix} + e_\psi \right\} = \quad (48)$$

$$\begin{pmatrix} i_d(n+a) \\ i_q(n+a) \end{pmatrix} + (T_{dead} - (S-1)T_C) \left\{ A \begin{pmatrix} i_d(n+a) \\ i_q(n+a) \end{pmatrix} + B \begin{pmatrix} v_{d1} \\ v_{q1} \end{pmatrix} + e_\psi \right\} +$$

$$(ST_C - T_{dead}) \left\{ A \begin{pmatrix} i_d(n+a) \\ i_q(n+a) \end{pmatrix} + B \begin{pmatrix} v_{d2} \\ v_{q2} \end{pmatrix} + e_\psi \right\} =$$

$$\begin{pmatrix} i_d(n+a) \\ i_q(n+a) \end{pmatrix} + T_C A \begin{pmatrix} i_d(n+a) \\ i_q(n+a) \end{pmatrix} + T_C e_\psi +$$

$$(T_{dead} - (S-1)T_C) B \begin{pmatrix} v_{d1} \\ v_{q1} \end{pmatrix} + (ST_C - T_{dead}) B \begin{pmatrix} v_{d2} \\ v_{q2} \end{pmatrix}$$

here, $A = \begin{pmatrix} -\frac{R}{L_D} & \omega_r \frac{L_q}{L_d} \\ -\omega_r \frac{L_d}{L_q} & -\frac{R}{L_q} \end{pmatrix}$, $B = \begin{pmatrix} \frac{1}{L_d} & 0 \\ 0 & \frac{1}{L_q} \end{pmatrix}$, $e_\psi = \begin{pmatrix} 0 \\ -\frac{1}{L_q} \omega_r \psi \end{pmatrix}$, $$\frac{T_{dead}}{T_C} \leq S < \frac{T_{dead}}{T_C} + 1 \quad (S \in Z, S \geq 0)$$

The expression (48) can obtain a current of time of (n+a+1) without operating the current value at the end of the period (1), and can perform the current prediction operation for two periods by one operation. With this, an amount of the operation can be reduced.

Therefore, in the present embodiment 3, by using the expression (48) at portions using the expressions (18) and (19) in the embodiment 1, i.e. at 1-4 and 1-8 in FIG. 8, the MPC with reduced operation amount can be performed.

Here, the expression (48) becomes the same as an expression in Non-Patent Document 2 when the ratio between the output cycle and the dead time is S=1. However, when the value of S is changed depending on an operation state, for instance, when considering that the dead time is variable depending on the current amount, this Non-Patent Document 2 cannot deal with cases other than S=1. In the case of the expression of the present embodiment 3, the dead time is generally considered, and even when shift from S=1 to S=2 occurs during the operation, by recalculating S, it is possible to deal with this case. Therefore, the present embodiment 3 is superior to Non-Patent Document 2.

As described above, according to the present embodiment 3, by performing the MPC performing the current prediction with the switching cycle of the output voltage being divided into two on the basis of the configuration in which the expressions (18) and (19) are replaced with the expression (48) in FIGS. 7 and 8, the control that can achieve high current control performance, low switching frequency and reduced operation amount as compared with the embodiment 1 can be performed.

In addition, as compared with the prior art documents, the present embodiment 3 has the advantage of having the effects without being affected by the ratio between the dead time and the switching cycle of the output voltage.

Embodiment 4

The same discussion as in the embodiment 3 can also be applied to the embodiment 2. This is an embodiment 4.

More specifically, by using the expression (48) at portions using the expressions (18) and (19) in the embodiment 2, i.e. at 2-4 and 2-8 in FIG. 11, the MPC with reduced operation amount can be performed.

As described above, according to the present embodiment 4, by performing the MPC performing the current prediction for a plurality of cycles of the switching cycle of the output voltage with the switching cycle of the output voltage being divided into two on the basis of the configuration in which the expressions (18) and (19) are replaced with the expression (48) in FIGS. 10, 11 and 12, the control that can achieve high current control performance, low switching frequency, reduced operation amount as compared with the embodiment 1 and longer operation time than the embodiment 1 can be performed.

In addition, as compared with the prior art documents, the present embodiment 4 has the advantage of having the effects without being affected by the ratio between the dead time and the switching cycle of the output voltage.

Although the present invention has been described in detail only for the above embodiments, it is obvious to those skilled in the art that various modifications and corrections can be made within the scope of the technical idea of the present invention. As a matter of course, such modifications and corrections belong to the scope of the claim.

The invention claimed is:

1. A power conversion system comprising:
    a higher control unit configured to generate a command current based on a command value;
    a model predictive control unit configured to
        set a plurality of assumed voltage vectors, which are assumed for vectors expressed by combination of an output voltage of each phase of a power converter, for each switching cycle of the output voltage,
        divide the switching cycle of the output voltage into two periods according to a ratio between a dead time and the switching cycle of the output voltage,
        calculate a predicted current, which is a predicted value of an output current of the power converter, of the assumed voltage vector for each of the two periods obtained by the two-dividing,
        determine, based on the command current, an evaluation function between the assumed voltage vector and the predicted current,
        set the assumed voltage vector or a combination of the assumed voltage vectors, each of which has highest evaluation function result, as a command voltage vector or a command voltage vector matrix, and
        output a gate signal based on the command voltage vector or the command voltage vector matrix; and
    the power converter configured to be driven and controlled based on the gate signal.

2. The power conversion system as claimed in claim 1, wherein
    the switching cycle of the output voltage is divided into two of a first period (Tdead−(S−1)Tc) and a second period (STc−Tdead) based on a set value S that is determined by the following expression (9)

[Expression 9]

$$\frac{T_{dead}}{T_C} \leq S < \frac{T_{dead}}{T_C} + 1 \quad (S \in Z, S \geq 0) \qquad (9)$$

Tdead: a dead time
Tc: a switching cycle of an output voltage
Z: an integer set.

3. The power conversion system as claimed in claim 2, wherein
    the model predictive control unit has:
        a prediction unit configured to
            set the assumed voltage vector,
            perform a dead time judgment based on a current polarity and a change of the assumed voltage vector, and
            when the dead time is judged by the dead time judgment, set a d-axis voltage and a q-axis voltage of the first period in the switching cycle, which is the set value S in number, of the output voltage to a d-axis voltage and a q-axis voltage before the change of the assumed voltage vector respectively, and set the d-axis voltage and the q-axis voltage of the first period after said switching cycle of the output voltage to a d-axis voltage and a q-axis voltage after the change of the assumed voltage vector respectively, also set a d-axis voltage and a q-axis voltage of the second period in the switching cycle, which is the set value (S−1) in number, of the output voltage to a d-axis voltage and a q-axis voltage before the change of the assumed voltage vector respectively, and set the d-axis voltage and the q-axis voltage of the second period after said switching cycle of the output voltage to a d-axis voltage and a q-axis voltage after the change of the assumed voltage vector respectively,
            determine the predicted current of the assumed voltage vector based on the d-axis voltage and the q-axis voltage of the first period and the d-axis voltage and the q-axis voltage of the second period,
            determine the evaluation function between the assumed voltage vector and the predicted current, and
            output, as the command voltage vector, the assumed voltage vector which has the highest evaluation function result; and
        a gate signal determination unit configured to output the gate signal for outputting a voltage expressed by the command voltage vector from the power converter.

4. The power conversion system as claimed in claim 2, wherein
    the model predictive control unit has:
        a prediction unit configured to
            set a plurality of assumed voltage vectors for each switching cycle of the output voltage in a prediction period,
            perform a dead time judgment based on a current polarity and a change of the assumed voltage vector, and
            when the dead time is judged by the dead time judgment, set a d-axis voltage and a q-axis voltage of the first period in the switching cycle, which is the set value S in number, of the output voltage to a d-axis voltage and a q-axis voltage before the change of the assumed voltage vector respectively, and set the d-axis voltage and the q-axis voltage of the first period after said switching cycle of the output voltage to a d-axis voltage and a q-axis voltage after the change of the assumed voltage vector respectively, also set a d-axis voltage and a q-axis voltage of the second period in the switching cycle, which is the set value (S−1) in number, of the output voltage to a d-axis voltage and a q-axis voltage before the change of the assumed voltage vector respectively, and set the d-axis voltage and the q-axis voltage of the second period after said switching cycle of the output voltage to a d-axis voltage and a q-axis voltage after the change of the assumed voltage vector respectively, determine the predicted current of the assumed voltage vector based on the d-axis voltage and the q-axis voltage of the first period and the d-axis voltage and the q-axis voltage of the second period, calculate the evaluation function between the assumed voltage vector and the predicted current, and output, as the command voltage vector matrix, the combination of the assumed voltage vectors which has the highest evaluation function result from among combinations of the assumed voltage vectors in the prediction period;

a reading unit configured to select and output, as an output voltage vector, a voltage vector of a switching cycle this time of the output voltage from the command voltage vector matrixes of the plurality of switching cycles of the output voltage; and a gate signal determination unit configured to output the gate signal for outputting a voltage expressed by the output voltage vector from the power converter.

5. The power conversion system as claimed in claim 3, wherein
the predicted current is calculated by the following expressions (18) and (19)

[Expression 18]

$$\begin{pmatrix} i'_d \\ i'_q \end{pmatrix} = \begin{pmatrix} i_d(n+a) \\ i_q(n+a) \end{pmatrix} + T_1 \left\{ A \begin{pmatrix} i_d(n+a) \\ i_q(n+a) \end{pmatrix} + B \begin{pmatrix} v_{d1} \\ v_{q1} \end{pmatrix} + e_\psi \right\} \quad (18)$$

$$= \begin{pmatrix} i_d(n+a) \\ i_q(n+a) \end{pmatrix} + (T_{dead} - (S-1)T_C) \left\{ A \begin{pmatrix} i_d(n+a) \\ i_q(n+a) \end{pmatrix} + B \begin{pmatrix} v_{d1} \\ v_{q1} \end{pmatrix} + e_\psi \right\}$$

[Expression 19]

$$\begin{pmatrix} i_d(n+a+1) \\ i_q(n+a+1) \end{pmatrix} = \begin{pmatrix} i'_d \\ i'_q \end{pmatrix} + T_2 \left\{ A \begin{pmatrix} i'_d \\ i'_q \end{pmatrix} + B \begin{pmatrix} v_{d2} \\ v_{q2} \end{pmatrix} + e_\psi \right\} \quad (19)$$

$$= \begin{pmatrix} i'_d \\ i'_q \end{pmatrix} + (ST_C - T_{dead}) \left\{ A \begin{pmatrix} i'_d \\ i'_q \end{pmatrix} + B \begin{pmatrix} v_{d2} \\ v_{q2} \end{pmatrix} + e_\psi \right\}$$

here, $A = \begin{pmatrix} -\frac{R}{L_d} & \omega_r \frac{L_q}{L_d} \\ -\omega_r \frac{L_d}{L_q} & -\frac{R}{L_q} \end{pmatrix}$, $B = \begin{pmatrix} \frac{1}{L_d} & 0 \\ 0 & \frac{1}{L_q} \end{pmatrix}$, $$e_\psi = \begin{pmatrix} 0 \\ -\frac{1}{L_q}\omega_r\psi \end{pmatrix}, \frac{T_{dead}}{T_C} \leq S < \frac{T_{dead}}{T_C} + 1 \quad (S \in Z, S \geq 0)$$

id': a d-axis current a first period ahead from a certain time
iq': a q-axis current a first period ahead from a certain time
id(n+a): a d-axis current of a certain time
iq(n+a): a q-axis current of a certain time
id(n+a+1): a predicted d-axis current a switching cycle of an output voltage ahead from a certain time
iq(n+a+1): a predicted q-axis current a switching cycle of an output voltage ahead from a certain time
T1: a first period
T2: a second period
Tdead: a dead time
Tc: a switching cycle of an output voltage
Vd1: a d-axis voltage of a first period
Vd2: a d-axis voltage of a second period
vq1: a q-axis voltage of a first period
Vq2: a q-axis voltage of a second period
S: a set value
R: a winding resistance
Ld: a d-axis inductance
Lq: a q-axis inductance
Ωr: an electrical angular velocity
ψ: the number of permanent magnet flux linkages.

6. The power conversion system as claimed in claim 4, wherein
the predicted current is calculated by the following expressions (18) and (19)

[Expression 18]

$$\begin{pmatrix} i'_d \\ i'_q \end{pmatrix} = \begin{pmatrix} i_d(n+a) \\ i_q(n+a) \end{pmatrix} + T_1 \left\{ A \begin{pmatrix} i_d(n+a) \\ i_q(n+a) \end{pmatrix} + B \begin{pmatrix} v_{d1} \\ v_{q1} \end{pmatrix} + e_\psi \right\} \quad (18)$$

$$= \begin{pmatrix} i_d(n+a) \\ i_q(n+a) \end{pmatrix} + (T_{dead} - (S-1)T_C) \left\{ A \begin{pmatrix} i_d(n+a) \\ i_q(n+a) \end{pmatrix} + B \begin{pmatrix} v_{d1} \\ v_{q1} \end{pmatrix} + e_\psi \right\}$$

[Expression 19]

$$\begin{pmatrix} i_d(n+a+1) \\ i_q(n+a+1) \end{pmatrix} = \begin{pmatrix} i'_d \\ i'_q \end{pmatrix} + T_2 \left\{ A \begin{pmatrix} i'_d \\ i'_q \end{pmatrix} + B \begin{pmatrix} v_{d2} \\ v_{q2} \end{pmatrix} + e_\psi \right\} \quad (19)$$

$$= \begin{pmatrix} i'_d \\ i'_q \end{pmatrix} + (ST_C - T_{dead}) \left\{ A \begin{pmatrix} i'_d \\ i'_q \end{pmatrix} + B \begin{pmatrix} v_{d2} \\ v_{q2} \end{pmatrix} + e_\psi \right\}$$

here, $A = \begin{pmatrix} -\frac{R}{L_d} & \omega_r \frac{L_q}{L_d} \\ -\omega_r \frac{L_d}{L_q} & -\frac{R}{L_q} \end{pmatrix}$, $B = \begin{pmatrix} \frac{1}{L_d} & 0 \\ 0 & \frac{1}{L_q} \end{pmatrix}$, $$e_\psi = \begin{pmatrix} 0 \\ -\frac{1}{L_q}\omega_r\psi \end{pmatrix}, \frac{T_{dead}}{T_C} \leq S < \frac{T_{dead}}{T_C} + 1 \quad (S \in Z, S \geq 0)$$

id': a d-axis current a first period ahead from a certain time
iq': a q-axis current a first period ahead from a certain time
id(n+a): a d-axis current of a certain time
iq(n+a): a q-axis current of a certain time
id(n+a+1): a predicted d-axis current a switching cycle of an output voltage ahead from a certain time
iq(n+a+1): a predicted q-axis current a switching cycle of an output voltage ahead from a certain time
T1: a first period
T2: a second period
Tdead: a dead time
Tc: a switching cycle of an output voltage
Vd1: a d-axis voltage of a first period
Vd2: a d-axis voltage of a second period vq1: a q-axis voltage of a first period
Vq2: a q-axis voltage of a second period
S: a set value
R: a winding resistance
Ld: a d-axis inductance
Lq: a q-axis inductance
Ωr: an electrical angular velocity
ψ: the number of permanent magnet flux linkages.

7. The power conversion system as claimed in claim 3, wherein the predicted current is calculated by the following expression (48)

[Expression 48]

$$\begin{pmatrix} i_d(n+a+1) \\ i_q(n+a+1) \end{pmatrix} = \begin{pmatrix} i'_d \\ i'_q \end{pmatrix} + (ST_C - T_{dead})\left\{ A\begin{pmatrix} i_d(n+a) \\ i_q(n+a) \end{pmatrix} + B\begin{pmatrix} v_{d2} \\ v_{q2} \end{pmatrix} + e_\psi \right\} = \quad (48)$$

$$\begin{pmatrix} i_d(n+a) \\ i_q(n+a) \end{pmatrix} + (T_{dead} - (S-1)T_C)\left\{ A\begin{pmatrix} i_d(n+a) \\ i_q(n+a) \end{pmatrix} + B\begin{pmatrix} v_{d1} \\ v_{q1} \end{pmatrix} + e_\psi \right\} +$$

$$(ST_C - T_{dead})\left\{ A\begin{pmatrix} i_d(n+a) \\ i_q(n+a) \end{pmatrix} + B\begin{pmatrix} v_{d2} \\ v_{q2} \end{pmatrix} + e_\psi \right\} =$$

$$\begin{pmatrix} i_d(n+a) \\ i_q(n+a) \end{pmatrix} + T_C A\begin{pmatrix} i_d(n+a) \\ i_q(n+a) \end{pmatrix} + T_C e_\psi +$$

$$(T_{dead} - (S-1)T_C)B\begin{pmatrix} v_{d1} \\ v_{q1} \end{pmatrix} + (ST_C - T_{dead})B\begin{pmatrix} v_{d2} \\ v_{q2} \end{pmatrix}$$

here, $A = \begin{pmatrix} -\dfrac{R}{L_D} & \omega_r \dfrac{L_q}{L_d} \\ -\omega_r \dfrac{L_d}{L_q} & -\dfrac{R}{L_q} \end{pmatrix}$, $B = \begin{pmatrix} \dfrac{1}{L_d} & 0 \\ 0 & \dfrac{1}{L_q} \end{pmatrix}$, $e_\psi = \begin{pmatrix} 0 \\ -\dfrac{1}{L_q}\omega_r \psi \end{pmatrix}$, $$\dfrac{T_{dead}}{T_C} \le S < \dfrac{T_{dead}}{T_C} + 1 \quad (S \in Z, S \ge 0)$$

id': a d-axis current a first period ahead from a certain time
iq': a q-axis current a first period ahead from a certain time
id(n+a): a d-axis current of a certain time
iq(n+a): a q-axis current of a certain time
id(n+a+1): a predicted d-axis current a switching cycle of an output voltage ahead from a certain time
iq(n+a+1): a predicted q-axis current a switching cycle of an output voltage ahead from a certain time
T1: a first period
T2: a second period
Tdead: a dead time
Tc: a switching cycle of an output voltage
Vd1: a d-axis voltage of a first period
Vd2: a d-axis voltage of a second period
vq1: a q-axis voltage of a first period
Vq2: a q-axis voltage of a second period
S: a set value
R: a winding resistance
Ld: a d-axis inductance
Lq: a q-axis inductance
Ωr: an electrical angular velocity
ψ: the number of permanent magnet flux linkages.

8. The power conversion system as claimed in claim 4, wherein
the predicted current is calculated by the following expression (48)

[Expression 48]

$$\begin{pmatrix} i_d(n+a+1) \\ i_q(n+a+1) \end{pmatrix} = \begin{pmatrix} i'_d \\ i'_q \end{pmatrix} + (ST_C - T_{dead})\left\{ A\begin{pmatrix} i_d(n+a) \\ i_q(n+a) \end{pmatrix} + B\begin{pmatrix} v_{d2} \\ v_{q2} \end{pmatrix} + e_\psi \right\} = \quad (48)$$

$$\begin{pmatrix} i_d(n+a) \\ i_q(n+a) \end{pmatrix} + (T_{dead} - (S-1)T_C)\left\{ A\begin{pmatrix} i_d(n+a) \\ i_q(n+a) \end{pmatrix} + B\begin{pmatrix} v_{d1} \\ v_{q1} \end{pmatrix} + e_\psi \right\} +$$

$$(ST_C - T_{dead})\left\{ A\begin{pmatrix} i_d(n+a) \\ i_q(n+a) \end{pmatrix} + B\begin{pmatrix} v_{d2} \\ v_{q2} \end{pmatrix} + e_\psi \right\} =$$

$$\begin{pmatrix} i_d(n+a) \\ i_q(n+a) \end{pmatrix} + T_C A\begin{pmatrix} i_d(n+a) \\ i_q(n+a) \end{pmatrix} + T_C e_\psi +$$

$$(T_{dead} - (S-1)T_C)B\begin{pmatrix} v_{d1} \\ v_{q1} \end{pmatrix} + (ST_C - T_{dead})B\begin{pmatrix} v_{d2} \\ v_{q2} \end{pmatrix}$$

here, $A = \begin{pmatrix} -\dfrac{R}{L_D} & \omega_r \dfrac{L_q}{L_d} \\ -\omega_r \dfrac{L_d}{L_q} & -\dfrac{R}{L_q} \end{pmatrix}$, $B = \begin{pmatrix} \dfrac{1}{L_d} & 0 \\ 0 & \dfrac{1}{L_q} \end{pmatrix}$, $e_\psi = \begin{pmatrix} 0 \\ -\dfrac{1}{L_q}\omega_r \psi \end{pmatrix}$, $$\dfrac{T_{dead}}{T_C} \le S < \dfrac{T_{dead}}{T_C} + 1 \quad (S \in Z, S \ge 0)$$

id': a d-axis current a first period ahead from a certain time
iq': a q-axis current a first period ahead from a certain time
id(n+a): a d-axis current of a certain time
iq(n+a): a q-axis current of a certain time
id(n+a+1): a predicted d-axis current a switching cycle of an output voltage ahead from a certain time
iq(n+a+1): a predicted q-axis current a switching cycle of an output voltage ahead from a certain time
T1: a first period
T2: a second period
Tdead: a dead time
Tc: a switching cycle of an output voltage
Vd1: a d-axis voltage of a first period
Vd2: a d-axis voltage of a second period
vq1: a q-axis voltage of a first period
Vq2: a q-axis voltage of a second period
S: a set value
R: a winding resistance
Ld: a d-axis inductance
Lq: a q-axis inductance
Ωr: an electrical angular velocity
ψ: the number of permanent magnet flux linkages.

9. A control method of a power conversion system that controls a power converter by model predictive control, the method comprising:
by a higher control unit,
generating a command current based on a command value;
by a model predictive control unit,
setting a plurality of assumed voltage vectors, which are assumed for vectors expressed by combination of an output voltage of each phase of the power converter, for each switching cycle of the output voltage;
dividing the switching cycle of the output voltage into two periods according to a ratio between a dead time and the switching cycle of the output voltage;
calculating a predicted current, which is a predicted value of an output current of the power converter, of the assumed voltage vector for each of the two periods obtained by the two-dividing;
determining, based on the command current, an evaluation function between the assumed voltage vector and the predicted current;
setting the assumed voltage vector or a combination of the assumed voltage vectors, each of which has highest evaluation function result, as a command voltage vector or a command voltage vector matrix; and
outputting, based on the command voltage vector or the command voltage vector matrix, a gate signal for driving and controlling the power converter.

\* \* \* \* \*